(12) United States Patent
Lanigan, Sr. et al.

(10) Patent No.: US 9,340,146 B2
(45) Date of Patent: May 17, 2016

(54) FRONT PIN LATCHING SYSTEM FOR AUTOMATIC SECUREMENT OF A CONTAINER TO A CONTAINER CHASSIS

(71) Applicant: Mi-Jack Products, Inc., Hazel Crest, IL (US)

(72) Inventors: John J. Lanigan, Sr., Orland Park, IL (US); Martin C. Conneally, Downers Grove, IL (US); Kenneth E. Svihlik, Orland Park, IL (US)

(73) Assignee: Mi-Jack Products, Inc., Hazel Crest, IL (US)

( * ) Notice: Subject to any disclaimer, the term of this patent is extended or adjusted under 35 U.S.C. 154(b) by 86 days.

(21) Appl. No.: 14/184,196

(22) Filed: Feb. 19, 2014

(65) Prior Publication Data
US 2015/0232014 A1 Aug. 20, 2015

(51) Int. Cl.
*B60P 7/13* (2006.01)

(52) U.S. Cl.
CPC ...................... *B60P 7/132* (2013.01)

(58) Field of Classification Search
CPC ............... B60P 7/13; B60P 7/06; B60P 7/08; B60P 7/00; B60P 1/64
USPC .................... 410/69, 70, 71, 77, 82
See application file for complete search history.

(56) References Cited

U.S. PATENT DOCUMENTS

| 3,614,153 | A | | 10/1971 | Tantlinger et al. |
| 4,047,748 | A | | 9/1977 | Whaley et al. |
| 4,212,251 | A | | 7/1980 | DiMartino |
| 4,236,858 | A | | 12/1980 | Hoese et al. |
| 4,266,820 | A | | 5/1981 | Whaley et al. |
| 4,382,734 | A | | 5/1983 | Synowiec et al. |
| 4,437,211 | A | | 3/1984 | Dorpmund |
| 5,564,725 | A | | 10/1996 | Brazeal |
| 5,573,360 | A | * | 11/1996 | Bennett ..................... 410/84 |
| 5,575,599 | A | * | 11/1996 | Conlee et al. ............. 410/69 |
| 5,839,864 | A | * | 11/1998 | Reynard .................... 410/69 |

(Continued)

FOREIGN PATENT DOCUMENTS

| EP | 1243466 A2 | 9/2002 |
| EP | 2308719 A1 | 4/2011 |
| WO | WO-2008/095605 A1 | 8/2008 |
| WO | WO-2011/066829 A1 | 6/2011 |

OTHER PUBLICATIONS

International Search Report and Written Opinion dated May 6, 2015, for International Application No. PCT/US2015/013543, Mi-Jack Products, Inc. (12 pages).

(Continued)

*Primary Examiner* — H Gutman
(74) *Attorney, Agent, or Firm* — McCracken & Gillen LLC

(57) ABSTRACT

A front pin latching system for automatic securement of a container to a container chassis is provided. The front pin latching system includes a shelf configured to move vertically on an outer surface of the container chassis. The shelf and the container chassis have adjacent openings. The system also includes a pin configured to move horizontally through the adjacent openings and a linkage mechanism disposed on an inner surface of the container chassis. The linkage mechanism is operably coupled to the shelf and the pin. Placement of the container on the container chassis moves the shelf causing the linkage mechanism to move the pin such that the pin automatically secures the container to the container chassis.

14 Claims, 39 Drawing Sheets

(56) References Cited

U.S. PATENT DOCUMENTS

| | | |
|---|---|---|
| 6,692,203 B2 | 2/2004 | Kim et al. |
| 7,484,918 B2 | 2/2009 | Brewster |
| 8,348,564 B2 | 1/2013 | Fukui |
| 2008/0014040 A1 | 1/2008 | Ding |
| 2010/0303573 A1 | 12/2010 | Brewster |
| 2015/0232013 A1* | 8/2015 | Lanigan et al. |
| 2015/0232015 A1* | 8/2015 | Lanigan et al. |

OTHER PUBLICATIONS

International Search Report and Written Opinion dated Jun. 25, 2015, for International Application No. PCT/US2015/013552, Mi-Jack Products, Inc. (15 pages).

International Search Report and Written Opinion dated Jul. 21, 2015, for International Application No. PCT/US2015/013577, Applicant, Mi-Jack Products, Inc. (10 pages).

* cited by examiner

FRONT PIN LATCHING SYSTEM FOR AUTOMATIC SECUREMENT OF A CONTAINER TO A CONTAINER CHASSIS

CROSS REFERENCE TO RELATED APPLICATIONS

This patent application incorporates by reference co-pending U.S. patent application Ser. No. 14/184,166, entitled "Latching System for Automatic Securement of a Container to a Container Chassis" by John J. Lanigan, Sr., filed Feb. 19, 2014, and U.S. patent application Ser. No. 14/184,421, entitled "Latching System for Automatic Securement of a Container to a Container Chassis" by John J. Lanigan, Sr., filed Feb. 19, 2014.

REFERENCE REGARDING FEDERALLY SPONSORED RESEARCH OR DEVELOPMENT

Not applicable.

SEQUENTIAL LISTING

Not applicable.

BACKGROUND OF THE DISCLOSURE

1. Field of the Disclosure

The present application relates generally to latching systems. More particularly, the present application relates to container latches for a container chassis.

2. Description of the Background of the Disclosure

In a conventional container chassis used for transporting a container, the container is secured to the container chassis by two latches spaced apart at each of the two front corners and two latches spaced apart at each of the two rear corners of the container chassis. These latches are manually operated by the driver or other personnel. The rear latches may have a twist lock that is inserted into the bottom of the corner castings of a container. The twist lock may be operated by a lever to move the twist lock between an unlatched position and a latched position. The front latches of a conventional chassis that is 40 to 53 feet in length may have locking pins that extend horizontally into openings of the corner castings of the container. The front of a conventional chassis that is 20 feet in length may utilize a twist lock and manual lever rather than the locking pins.

Such conventional latching devices are manually operated by the chassis driver or other personnel when a container is placed on a chassis. In turn, the conventional latching devices are manually unlocked before the container is removed from the chassis. The driver or other personnel may improperly or incompletely lock or unlock the latching devices, which may cause improper unloading of the container from the chassis or create the potential for shifting of or losing a container during road transport. Thus, there exists a need for an automatic latching system that does not require human intervention.

In the railway transportation industry, a container is typically secured to the four corners of a flatcar using a swing-type latch. Two swing-type latches spaced apart at each of the two front corners and two swing-type latches spaced apart at each of the two rear corners of the flatcar secure the container thereto. Similar to the twist lock latch of a container chassis, the swing-type latches of the flatcar enter openings along the bottom surface of each corner casting of the container. Unlike the twist lock latch, the swing-type latch is continuously biased into position by a spring. As the container is placed on the flatcar, the latch is pushed back against a spring until the latch clears the bottom surface of the corner casting. The latch is designed such that a significant force must be applied against the latch to remove the container from the flatcar. A container weight of approximately 700 lbs may be required to load the container onto the flatcar, and a force of approximately 2,000 lbs, for example, is used to remove the container from the flatcar.

SUMMARY OF THE DISCLOSURE

A front pin latching system for automatic securement of a container to a container chassis is provided. The front pin latching system includes a shelf configured to move vertically on an outer surface of the container chassis. The shelf and the container chassis have adjacent openings. The system also includes a pin configured to move horizontally through the adjacent openings and a linkage mechanism disposed on an inner surface of the container chassis. The linkage mechanism is operably coupled to the shelf and the pin. Placement of the container on the container chassis moves the shelf causing the linkage mechanism to move the pin such that the pin automatically secures the container to the container chassis.

Further, a front pin latching arrangement for automatic securement of a container to a container chassis is provided. The front pin latching arrangement includes first and second latching systems disposed proximate to two corners of a container chassis, wherein each of the first and second latching systems automatically secure the container to the container chassis. The front pin latching arrangement also includes an interlock assembly operably coupled to the first and second latching systems. The interlock assembly is configured to provide a fail-safe operation such that the first and second latching systems maintain securement of the container to the container chassis.

Finally, a method for automatic securement of a container to a container chassis is also provided. The method includes vertically moving a shelf on an outer surface of the container chassis; horizontally moving a pin through adjacent openings of the shelf and the container chassis; placing the container on the container chassis such that the shelf receives a corner casting of the container, wherein the corner casting has a container chassis opening to receive the pin; and causing the pin to move in response to movement of the shelf such that the container is automatically secured to the container chassis.

Other aspects and advantages of the present invention will become apparent upon consideration of the following detailed description.

DETAILED DESCRIPTION

Figure 1:
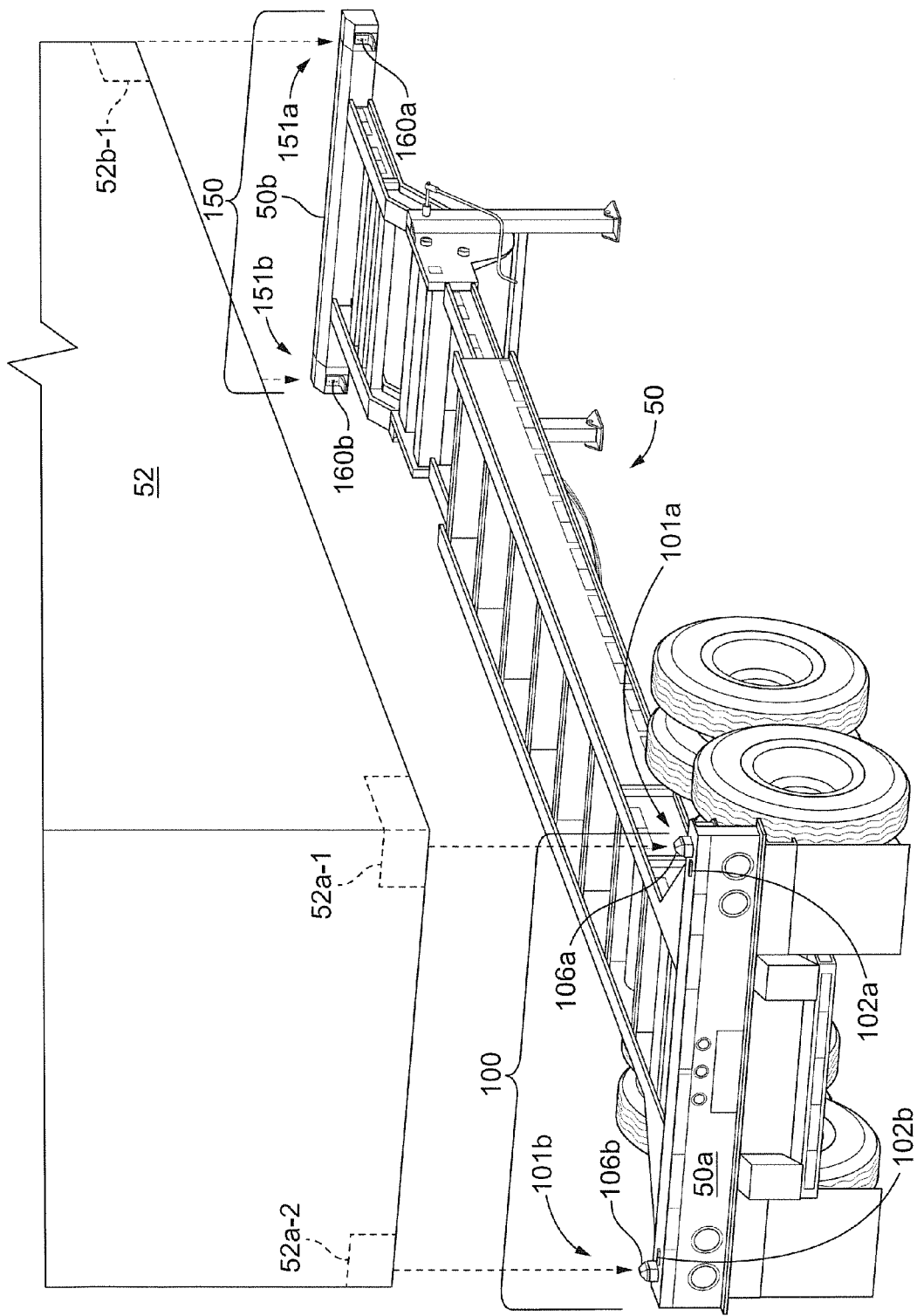
FIG. 1 is a rear isometric view of a container chassis including a latching arrangement and a front pin latching arrangement.

Various self-latching container latching systems for use with a container chassis are described herein. As seen, such systems allow for the automatic latching and unlatching of an empty, filled, or partially filled container to and from a container chassis. In the drawings, like reference numerals connote like structures throughout.

Referring to FIG. 1, a container chassis 50 features two of the container latching systems described herein to secure a container 52 thereto. A latching arrangement 100 having connectors 106a, 106b is provided on a rear portion 50a of the chassis 50. Each bottom surface of two rear corner castings 52a-1, 52a-2 of the container 52 has a rectangular hole 53a (shown in FIG. 5) to receive the connectors 106a, 106b in the unlatched position. A front pin arrangement 150 having front pins 160 is provided on a front portion 50b of the container chassis 50. Each front surface of two front corner castings 52b-1, 52b-2 of the container 52 has a hole 53b (shown in FIG. 8) to receive the front pins 160. The latching arrangement 100 and the front pin arrangement 150 are described in greater detail below.

The container chassis 50 shown in the embodiment in FIG. 1 may have a length of 40 to 53 feet, for example. A container chassis having a length of 20 feet (not shown) may utilize the latching arrangement 100 or alternative latching arrangements 200, 250, described below, in the rear and/or front portions of the container chassis.

Latching Arrangement 100

Figure 2:
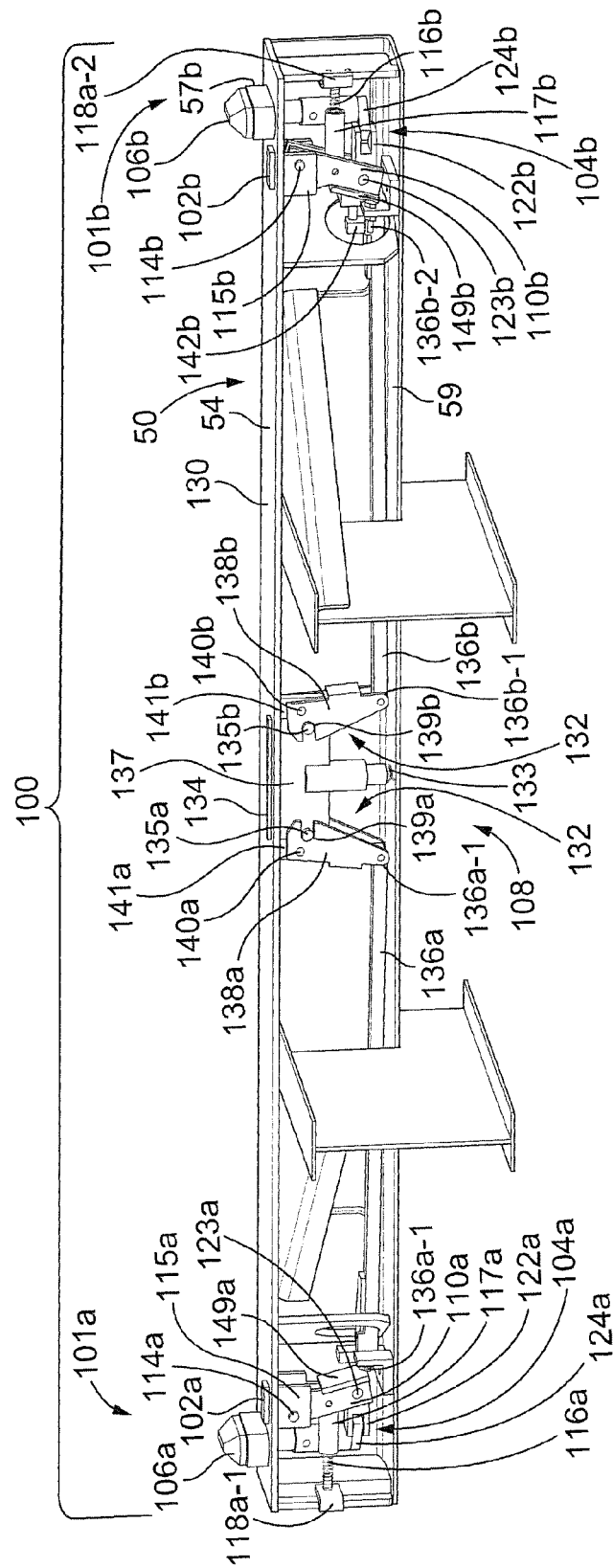
FIG. 2 is a front isometric view of the latching arrangement.
Figure 4:
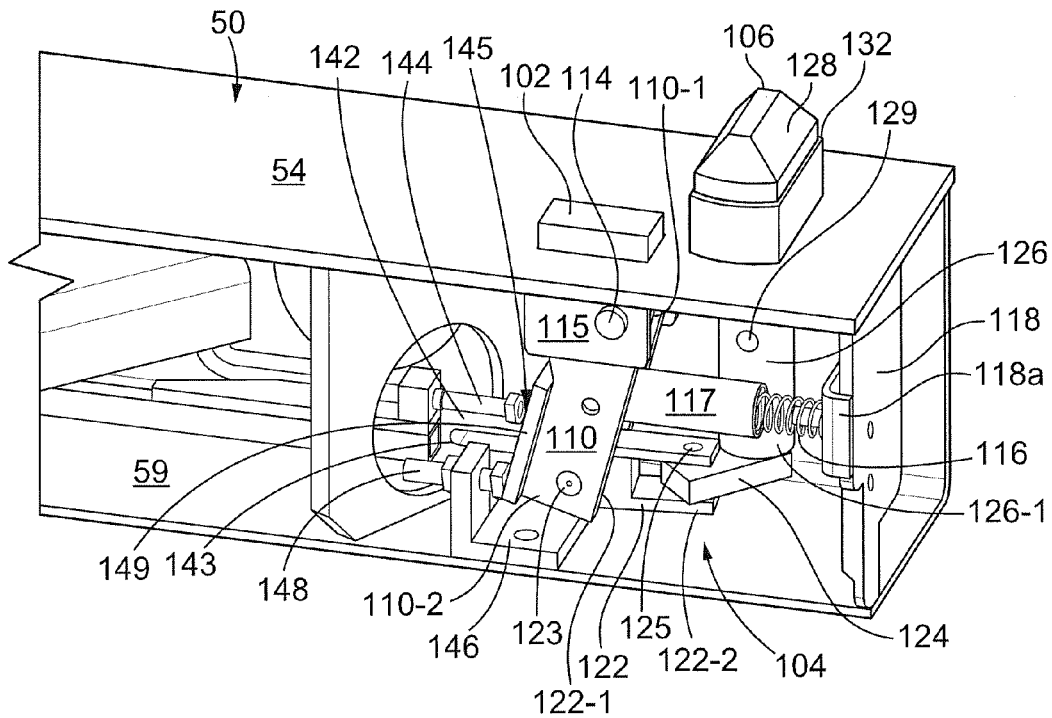
FIG. 4 is a front isometric view of a latching system in an unlatched position.
Figure 5:
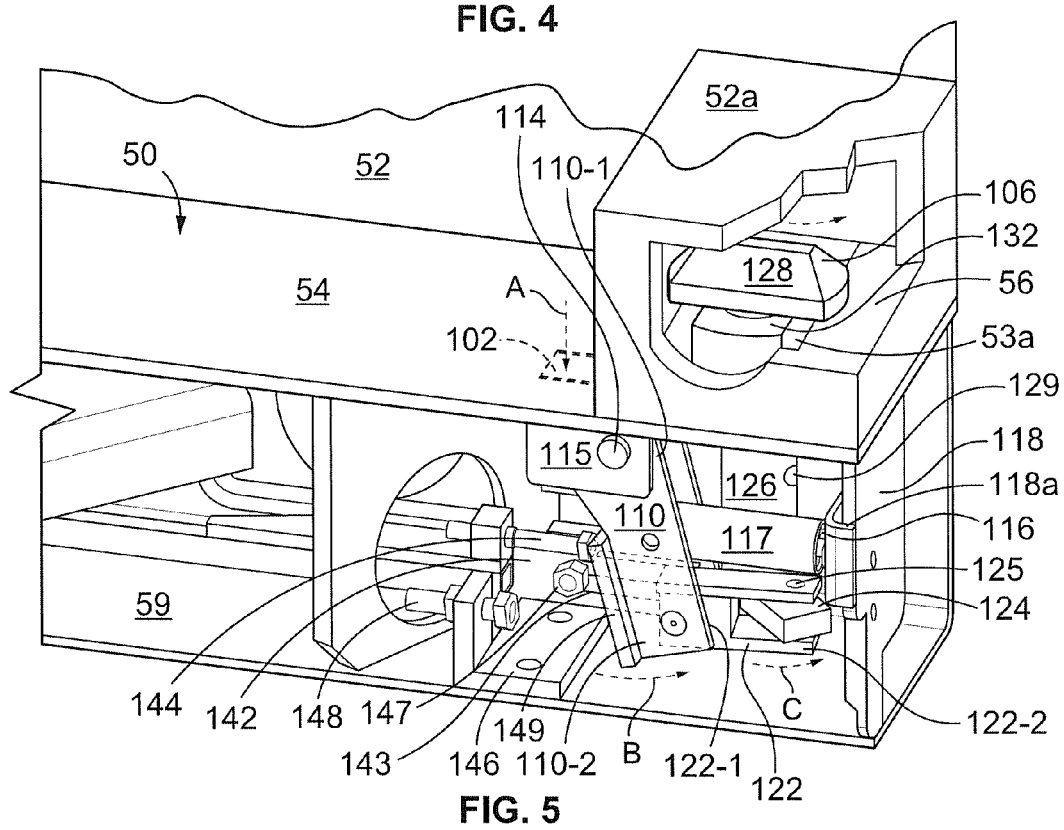
FIG. 5 is a front isometric view of the latching system of FIG. 4 in a latched position.

An example latching arrangement 100 for automatic securement of a container 52 to a container chassis 50 is provided in FIG. 2. The latching arrangement 100 includes a first latching system 101a and a second latching system 101b disposed proximate to two corners at a front or rear of the container chassis 50 with an interlock assembly 108 operably coupled to the first and second latching systems 101a, 101b. When a container 52 is loaded onto the container chassis 50 as shown in FIG. 1, each rear corner casting 52a depresses first and second actuation devices 102a, 102b of respective first and second latching systems 101a, 101b, which causes respective first and second connectors 106a, 106b to move from an unlatched position as shown in FIG. 4 to a latched position as shown in FIG. 5.

More specifically, placement of the container 52 on the container chassis 50 actuates the actuation devices 102a, 102b, of the respective first and second latching systems 101a, 101b, causing respective linkage mechanisms 104a, 104b to move the respective connectors 106a, 106b and automatically secure the container 52 to the container chassis 50. In the latched position, the connectors 106a, 106b prevent movement of the container 52 apart from the container chassis 50. The interlock assembly 108 is configured to provide a fail-safe operation such that the first and second latching systems 101a, 101b maintain securement of the container 52 to the container chassis 50.

In the example shown in FIG. 2, the connectors 106a, 106b may be twist locks. Other connector means, such as a bolt, a latch, or a pin, may be utilized. Similarly, the actuation devices 102a, 102b in the example embodiment seen in FIG. 2 may be plungers, although other actuation means are envisioned. Examples of possible non-powered mechanical means include but not limited to a plunger lever, a switch, a lever arm, a drive bar, and a button. Automatic, powered mechanical means such as an air solenoid, an electric solenoid, a pneumatic cylinder, or a hydraulic cylinder may also be utilized.

Figure 3:
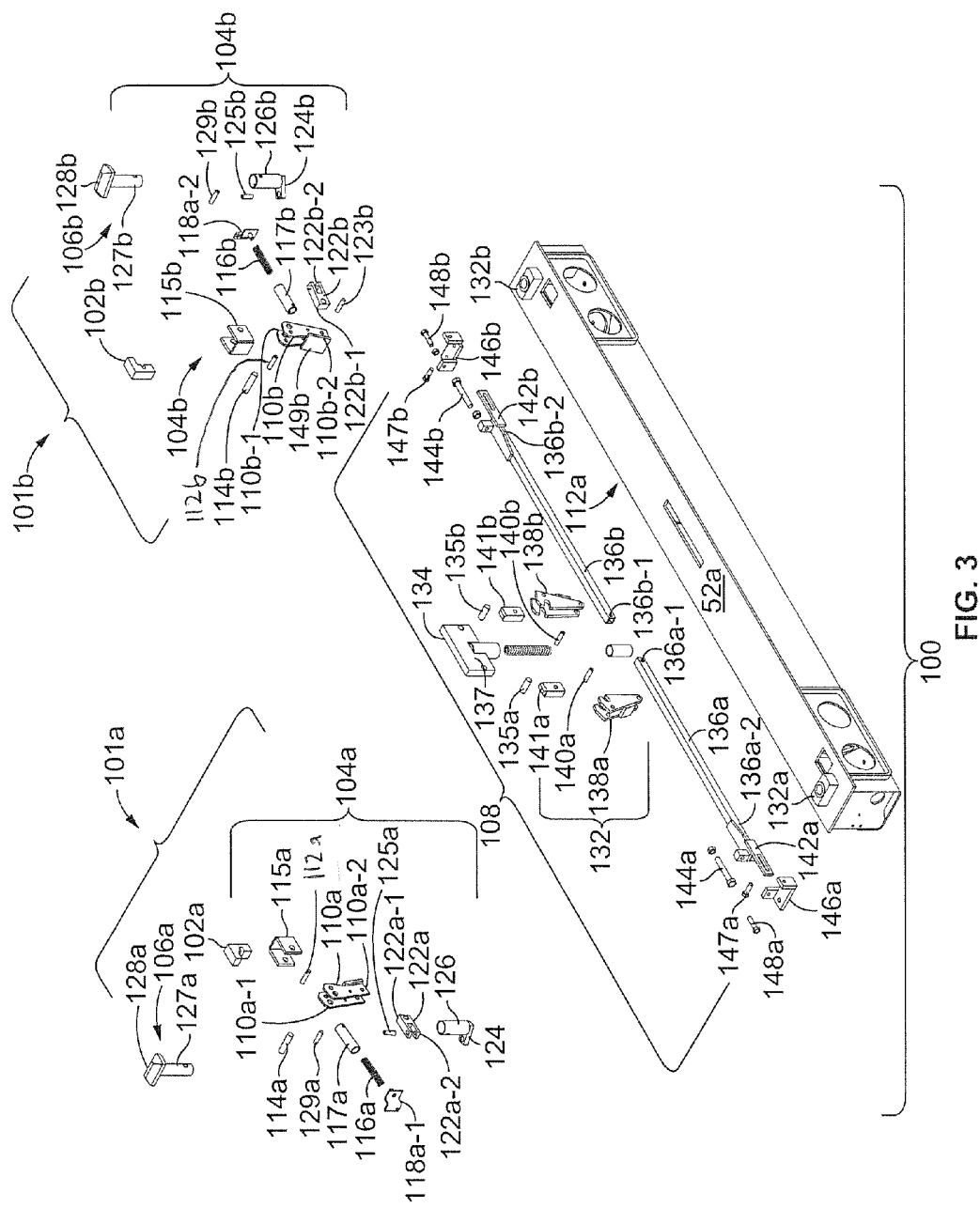
FIG. 3 is an exploded rear isometric view of the latching arrangement.

Referring now to FIG. 3, the example latching arrangement 100 is shown in an exploded view. Each first and second latching system 101a, 101b of the latching arrangement 100 includes an actuation device 102a, 102b, a linkage mechanism 104a, 104b, and the connector 106a, 106b. Each linkage mechanism 104a, 104b, in this example, includes a lever link 110a, 110b, a pivot 114a, 114b, a fastener 112a, 112b, a structure 115a, 115b, a fastener 123a, 123b, a connector link 122a, 122b, an arm 124a, 124b, a fastener 125a, 125b, a bolt 129a, 129b, a spring 116a, 116b, a spring housing 117a, 117b, and a bracket 118a-1, 118a-b. The interlock assembly 108, in this example, includes an actuation device 134, first and second pivots 140a, 140b, first and second structures 141a, 141b, first and second arms 138a, 138b, a spring 133, first and second rods 136a, 136b, first and second guides 142, first and second stop bolts 144a, 144b, first and second structures 146a, 146b, first and second bolts 147a, 147b, and first and second bolts 148a, 148b. The actuation device 134 is a vertical plate 137 having first and second protrusions 135a, 135b extending horizontally therefrom.

As shown in FIG. 4, the actuation device 102 is disposed on an upper surface 54 of the container chassis 50. In particular, the actuation device 102 extends from and through the upper surface 54 of the container chassis 50 when the connector 106 is in the unlatched position. When the connector 106 is in the latched position, the actuation device 102 is level with the upper surface 54 of the container chassis 50. As noted above, the connector 106 is positioned on a further surface 132 elevated above the upper surface 54 of the container chassis 50. The connector 106 includes a head 128 disposed above the further surface 132 on the container chassis 50 and a shaft 127 that extends through the upper surface 54 and further surface 132 of the container chassis 50. The linkage mechanism 104 is disposed below the upper surface 54.

Best seen in FIG. 5, the corner casting 52a includes an opening 53a on a bottom surface 56 thereof that receives the connector 106. The further surface 132 has a height that corresponds to the thickness of the bottom surface 56 of the rear corner casting 52a. The actuation device 102 is dimensioned such that the connector 106 enters the opening 53a before the actuation device 102 is actuated.

Referring to FIGS. 4 and 5, the linkage mechanism 104 translates the vertical movement of the actuation device 102 into rotational movement of the connector 106 when the actuation device 102 is actuated by placement of the container 52 on the container chassis 50. In the example shown in the figures, the connector 106 comprises a twist lock that rotates approximately 90 degrees upon actuation of the actuation device 102.

More specifically, a first end 110-1 of the lever link 110 is coupled to the pivot 114 that is mounted on the structure 115 welded to the underside of an upper surface 54 of the container chassis 50. A second end 110-2 of the lever link 110 opposite the first end 110-1 is coupled to a first end 122-1 of the connector link 122 by means of the fastener 123 to allow for rotational movement.

Similarly, the fastener 125 connects a second end 122-2 of the connector link 122 to the arm 124. The arm 124 is fixed to a cylindrical shaft 126 and extends horizontally therefrom. The arm 124 may be welded to or formed in the same mold as the shaft 126. Referring back to FIG. 3, the shaft 126 is coupled to the shaft 127 of the connector 106 via bolt 129 such that the shafts 126, 127 have a common axis.

Shown best in FIG. 4, the spring 116 of the linkage mechanism 104 is biased against movement of the lever link 110. The spring 116 is disposed within the spring housing 117 between the second end 110-2 of the lever link 110 and an outer surface 118 of the container chassis 50. The bracket 118a may be mounted on the outer surface 118 to receive the spring 116.

In the unlatched position shown in FIG. 4, the actuation device 102 is disposed on an upper surface 54 of the container chassis 50, and the spring 116 biases the lever link 110 away from the outer surface 118 of the container chassis 50. The actuation device 102 engages with the level link 110 by means of the fastener 112. Specifically, depression of the actuation device 102 causes the lever link 110 to rotate about the pivot 114 toward the outer surface 118 of the container chassis 50 against the bias of the spring 116, thereby causing movement of the connector 106 from an unlatched position shown in FIG. 4 into the latched position shown in FIG. 5.

Referring again to FIG. 2, the interlock assembly 108 may provide a fail-safe operation such that the first and second latching systems 101a, 101b maintain securement of the container 52 to the container chassis 50. In the event of an uneven lift caused by, for example, rounding a corner during transport or improper removal of a container, the interlock assembly 108 acts like a spring-loaded latch to maintain the latching systems 101a, 101b in the latched position. Placement of the container 52 on the container chassis 50 actuates the actuation device 134, causing the interlock mechanisms 132 to move each of the first and second rods 136a, 136b towards the respective first and second latching systems 101a, 101b. In the example shown in FIG. 2, the actuation device 134 of the interlock assembly 108 is spaced apart from the actuation devices 102a, 102b of the respective first and second latching systems 101a, 101b. Rods 136a, 136b may be a flat bar or plate, a circular rod, a rod having a square or other geometrical cross section.

FIG. 2 shows first and second latching systems 101a, 101b disposed proximate to two corners at a front or rear of the container chassis 50. The actuation device 134 is disposed on the upper surface 54 of the container chassis 50, and the interlock mechanism 132 is disposed below the upper surface 54 of the container chassis 50. The first and second rods 136a, 136b extend from the interlock mechanism 132 to the respective first and second latching systems 101a, 101b. The first and second rods 136a, 136b rest in a first position when the actuation device 134 is not actuated, and the first and second rods 136a, 136b rest in a second position when the actuation device 134 is actuated.

The interlock mechanism 132 translates the vertical movement of the actuation device 134 into horizontal movement of the first and second rods 136a, 136b when the actuation device 134 is actuated by placement of the container 52 on the container chassis 50. The interlock mechanism 132 includes the spring 133, the first and second arms 138a, 138b, and the first and second pivots 140a, 140b. The spring 133 disposed between the bottom surface 59 of the container chassis 50 and the actuation device 134 is biased against movement of the actuation device 134.

The first and second arms 138a, 138b connect the plate 137 of the actuation device 134 to first ends 136a-1, 136b-1 of respective first and second rods 136a, 136b as shown in FIG. 2. The arms 138a, 138b rotate about respective first and second pivots 140a, 140b secured to respective first and second structures 141a, 141b mounted to the underside of the upper surface 54 of the container chassis 50. Further, the arms 138a, 138b are operatively coupled to the actuation device 134 such that downward movement of the actuation device 134 causes each arm 138a, 138b to rotate about the respective pivot 140a, 140b. The arms 138a, 138b also are connected to the respective first ends 136a-1, 136b-1 of the respective first and second rods 136a, 136b, and movement of the arms 138a, 138b about the pivots 140a, 140b results in outward movement of the rods 136a,136b toward the respective latching system 101a, 101b.

In particular, the plate 137 of the actuation device 134 includes first and second protrusions 135a, 135b that extend horizontally therefrom and move vertically with the actuation device 134. In one example embodiment, first and second protrusions 135a, 135b are pins driven horizontally through the plate 137. First and second notches 139a, 139b along inner surfaces of the arms 138a, 138b receive the respective first and second protrusions 135a, 135b. The first and second protrusions 135a, 135b are in communication with the first and second arms 138a, 138b, and more specifically, the first and second notches 139a, 139b, so as to enable the vertical movement of the actuation device 134 to rotate the first and second arms 138a, 138b about respective first and second pivots 140a, 140b.

Shown best in FIGS. 4 and 5, the second end 136-2 of the rod 136 of the interlock assembly 108 interacts with the latching system 101. The guide 142 having a slot 143 is coupled to a second end 136-2 of the rod 136. The slot 143 receives the bolt 147 that is coupled to the structure 146 mounted on or otherwise secured to the container chassis 50. As the latching system 101 moves between the unlatched (see FIG. 4) and latched positions (see FIG. 5), the bolt 147 moves along the slot 143.

The stop bolt 144 also moves with the second end 136-2 of the rod 136 between the unlatched (see FIG. 4) and latched positions (see FIG. 5). A plate 149 secured to the lever link 110 is positioned adjacent the stop bolt 144. The rod 126 and the lever link 110 move consistently and simultaneously between the latched and unlatched positions such that a gap 145 is maintained between the stop bolt 144 of the rod 136 and the plate 149 of the lever link 110 during normal use. In the event that the linkage mechanism 104 is unable to maintain the lever link 110 in the latched position, the gap 145 is eliminated as the stop bolt 144 resists movement of the lever link 110 such that the lever link 110 is held in place against the spring 116, and the connector 106 remains in the latched position.

The second bolt 148 fastened to the structure 146 is positioned such that the second end 110-2 of the lever link 110 swings toward and away from the second bolt 148 when the latching system 101 moves between the unlatched (see FIG. 4) and latched positions (see FIG. 5). This second bolt 148 provides a surface against which the lever link 110 rests when the latching system 101 is in the unlatched position.

Operation of the latching arrangement 100 will now be described. Referring again to FIG. 4, the latching system 101 is shown in the unlatched position. The actuation device 102 extends from the upper surface 54 of the chassis 50. When a container 52 is placed upon the container chassis 50 as shown in FIG. 5, the actuation device 102 is depressed along path A. Depression of the actuation device 102 causes the second end 110-2 of the lever link 110 to move along path B, which in turn causes the second end 122-2 of the connector link 122 to move along path C. The movement of the second end 122-2 of the connector link 122 rotates the arm 124 and connector 106 along path D into the latched position.

When the container 52 is removed from the chassis 50, the spring 116 forces the lever link 110 toward the center of the chassis 50. This movement causes the connector link 122 and the arm 124 to shift away from the outer surface 118 of the container chassis 50, which causes the connector 106 to rotate into the unlatched position.

Such placement of the container 52 on the container chassis 50 also causes the interlock assembly 108 to move from a first position (partially shown in FIG. 4) to a second position (partially shown in FIG. 5). Depression of the actuation device 134 causes each first and second arm 138a, 138b to move respective first and second rod 136a, 136b toward the respective first and second latching system 101a, 101b. When the container 52 is removed from the chassis 50, the spring 133 causes the actuation device 134 to rise, thereby causing the rods 136a, 136b to move horizontally away from the outer surface 118 of the container chassis 50.

Front Pin Latching Arrangement 150

Figure 6:
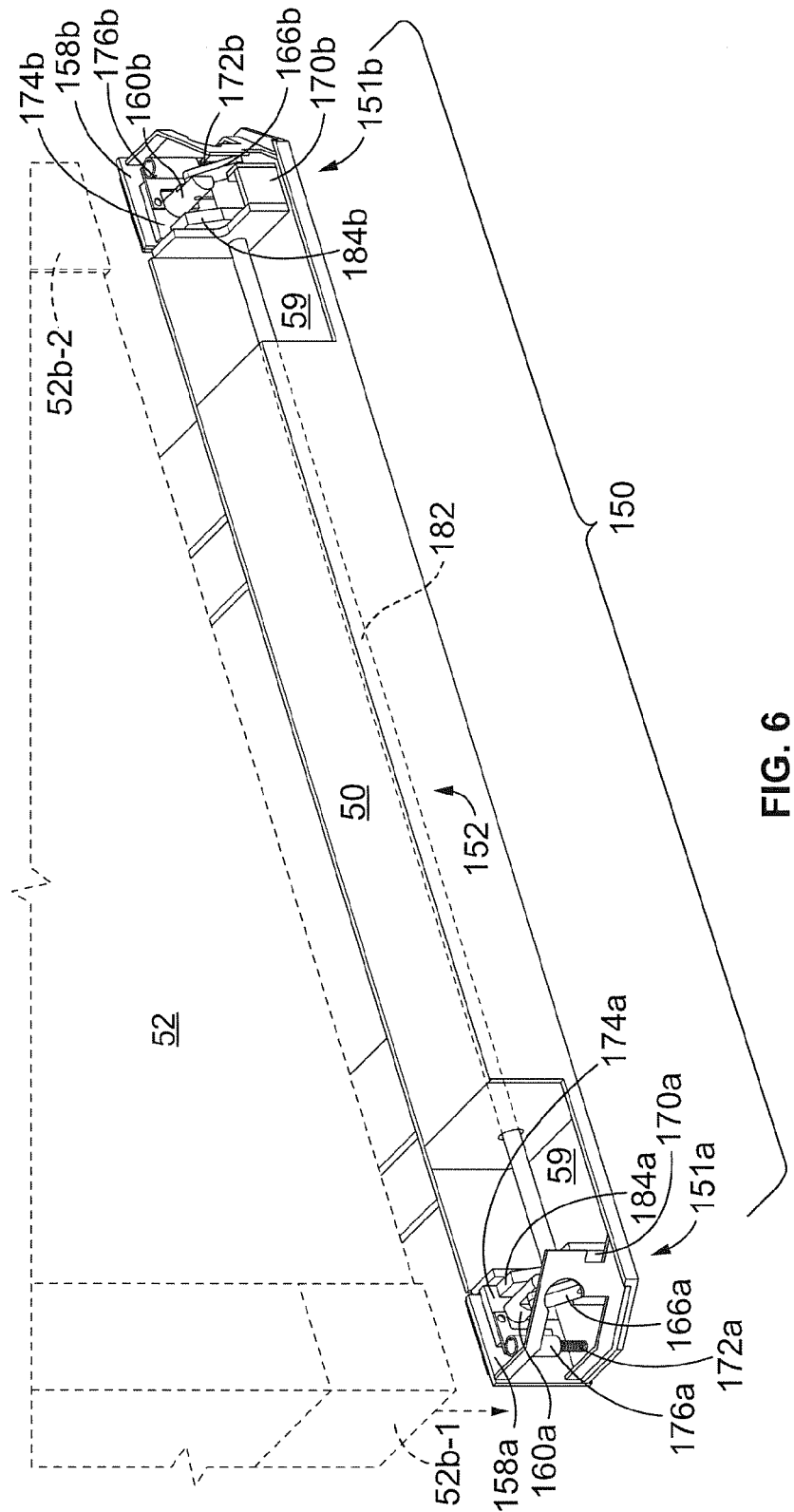
FIG. 6 is a front isometric view of a front pin latching arrangement.

Referring to FIG. 6, an example front pin latching arrangement 150 for automatic securement of a container 52 to a container chassis 50 is shown. The front pin latching arrangement 150 includes a first front pin latching system 151a and a second front pin latching system 151b disposed proximate to two front corners of a container chassis 50. Each front pin latching system 151a, 151b, in this example, includes a shelf 154 (shown in FIG. 8) and a pin 160 that move between first, unlatched positions (shown in FIG. 8) and second, latched positions (shown in FIG. 10). When a container 52 is loaded onto the container chassis 50 as shown in FIG. 1, the shelf 154 receives a corner casting 52b of the container 52 and moves downwardly such that the pin 160 extends outwardly into a corner casting opening 53b (shown in FIG. 8) of the corner casting 52b to secure the container 52 to the container chassis 50.

More specifically, placement of the container 52 on the container chassis 50 moves the shelf 154, causing the linkage mechanism 162 to move the pin 160 such that the pin 160 automatically secures the container 52 to the container chassis 50. The pin 160 restricts movement between the corner casting 52b of the container 52 and the container chassis 50 such that each front pin latching system 151 automatically secures the container 52 to the container chassis 50.

In this example, the front pin latching arrangement 150 also includes an interlock assembly 152 operably coupled to the first and second front pin latching systems 151a, 151b. The interlock assembly 152 is configured to provide a failsafe operation to such that the first and second front pin latching systems 151a, 151b maintain securement of the container 52 to the container chassis 50.

In the example shown in FIG. 6, the front pin latching systems 151a, 151b utilize the pins 160a, 160b to secure the container 52 to the container chassis 50. Other connector means such as a screw or a latch may be utilized. Similarly, the example container chassis 50 of FIG. 6 comprises a first insert 158a and a second insert 158b into which each of the respective first and second front pin latching systems 151a, 151b are mounted. A person of skill in the art could mount the front pin latching systems 151a, 151b directly to the container chassis 50 without the need for an insert 158 or other separate component.

Figure 7:
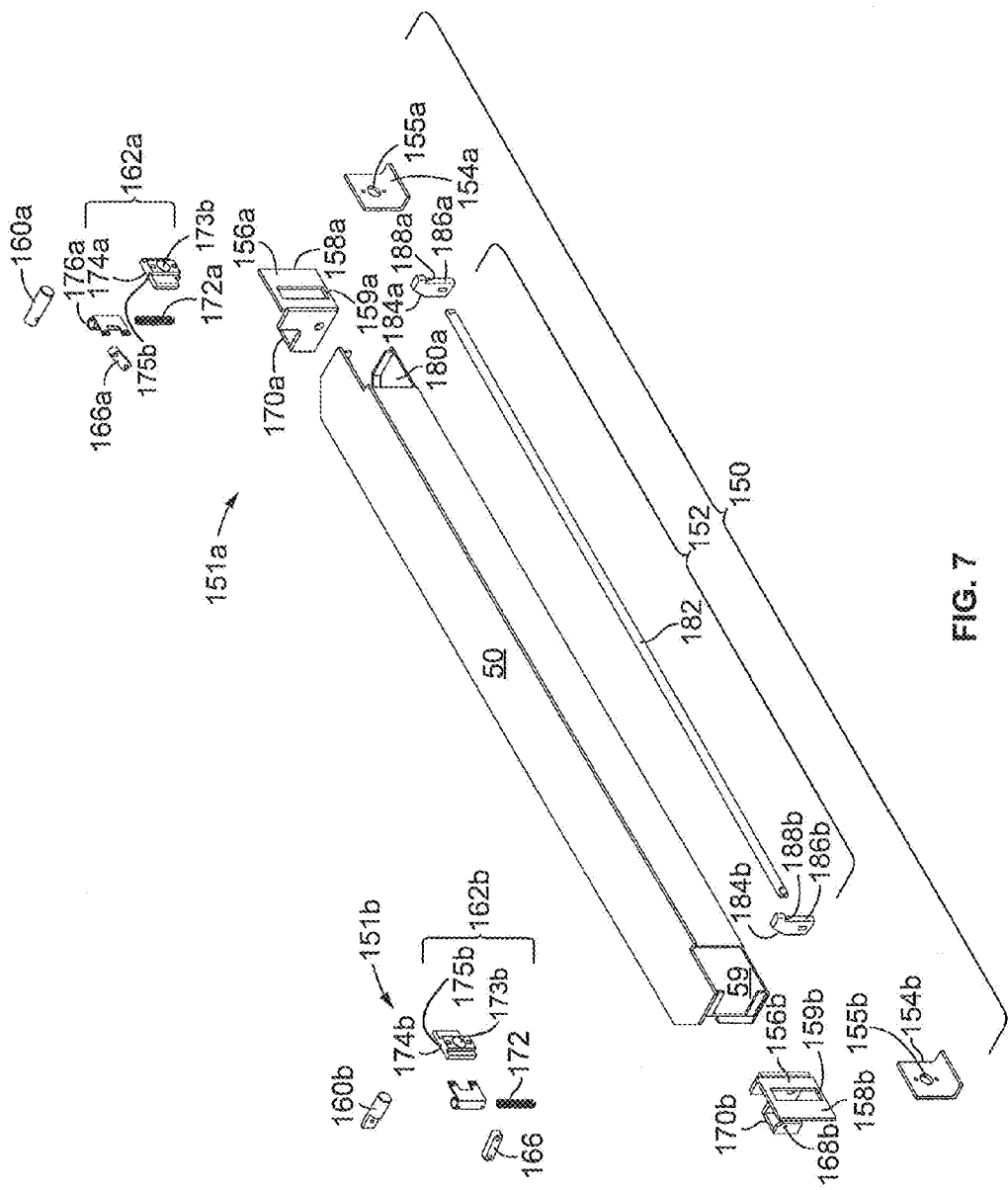
FIG. 7 is an exploded rear isometric view of the front pin latching arrangement.

Referring now to FIG. 7, the front pin latching arrangement 150 is shown in an exploded view. Each of the first and second front pin latching systems 151a, 151b is mounted to a respective first and second insert 158a, 158b, and each insert 158a, 158b is dimensioned to fit within the two opposite corners of a container chassis 50. The insert 158a, 158b may be welded or otherwise secured within the container chassis 50. The front pin latching system 151a, 151b, in this example embodiment, includes the shelf 154a, 154b, the pin 160a, 160b, and the linkage mechanism 162a, 162b. As shown in the example of FIG. 7, the linkage mechanism 162a, 162b includes a link 166a, 166b, a spring 172a, 172b, a plate 174a, 174b, and a spring housing 176a, 176b. The interlock assembly 152, in this example embodiment, includes a rod 182, a first tab 184a adjacent the first front pin latching system 151a, and a second tab 184b adjacent the second front pin latching system 151b.

Figure 8:
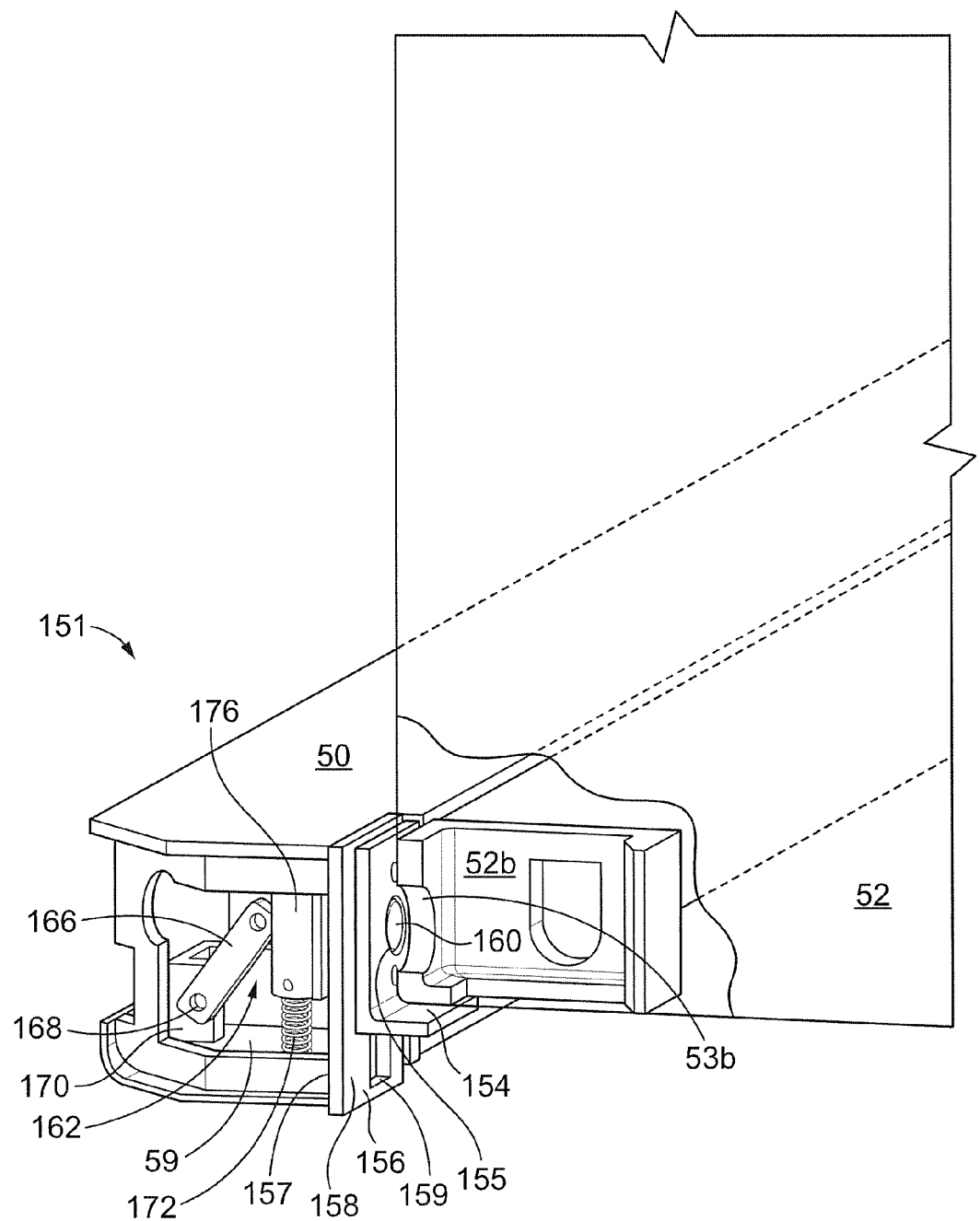
FIG. 8 is a front side isometric view of a front pin latching system in a first position.

As shown in FIG. 8, the shelf 154 is configured to move vertically on the outer surface 156 of the insert 158. The shelf 154 and the insert 158 have adjacent openings, 155, 159, respectively. The pin 160 is positioned within the container chassis 50 relative to the shelf 154, and is configured to move horizontally through the adjacent openings, 155, 159. The pin 160 is also configured to move vertically with the shelf 154 during placement of the container 52 on the container chassis 50. Thus, the pin 160 enters the corner casting opening 53b as the shelf 154 moves downward. The linkage mechanism 162 is disposed on an inner surface 157 of the insert 158.

Figure 9:
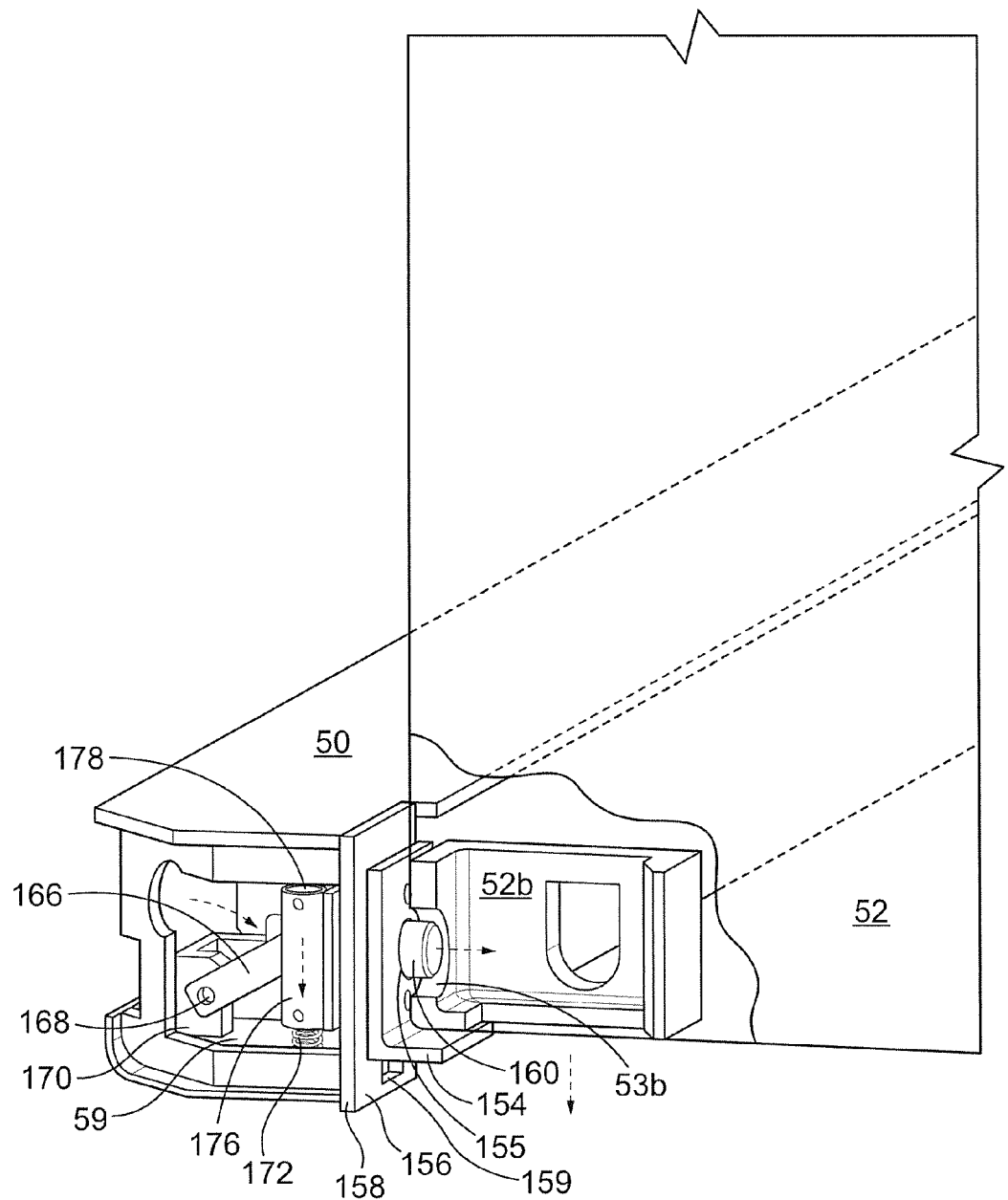
FIG. 9 is a front side isometric view of the front pin latching system of FIG. 8 between the first position and a second position.
Figure 10:
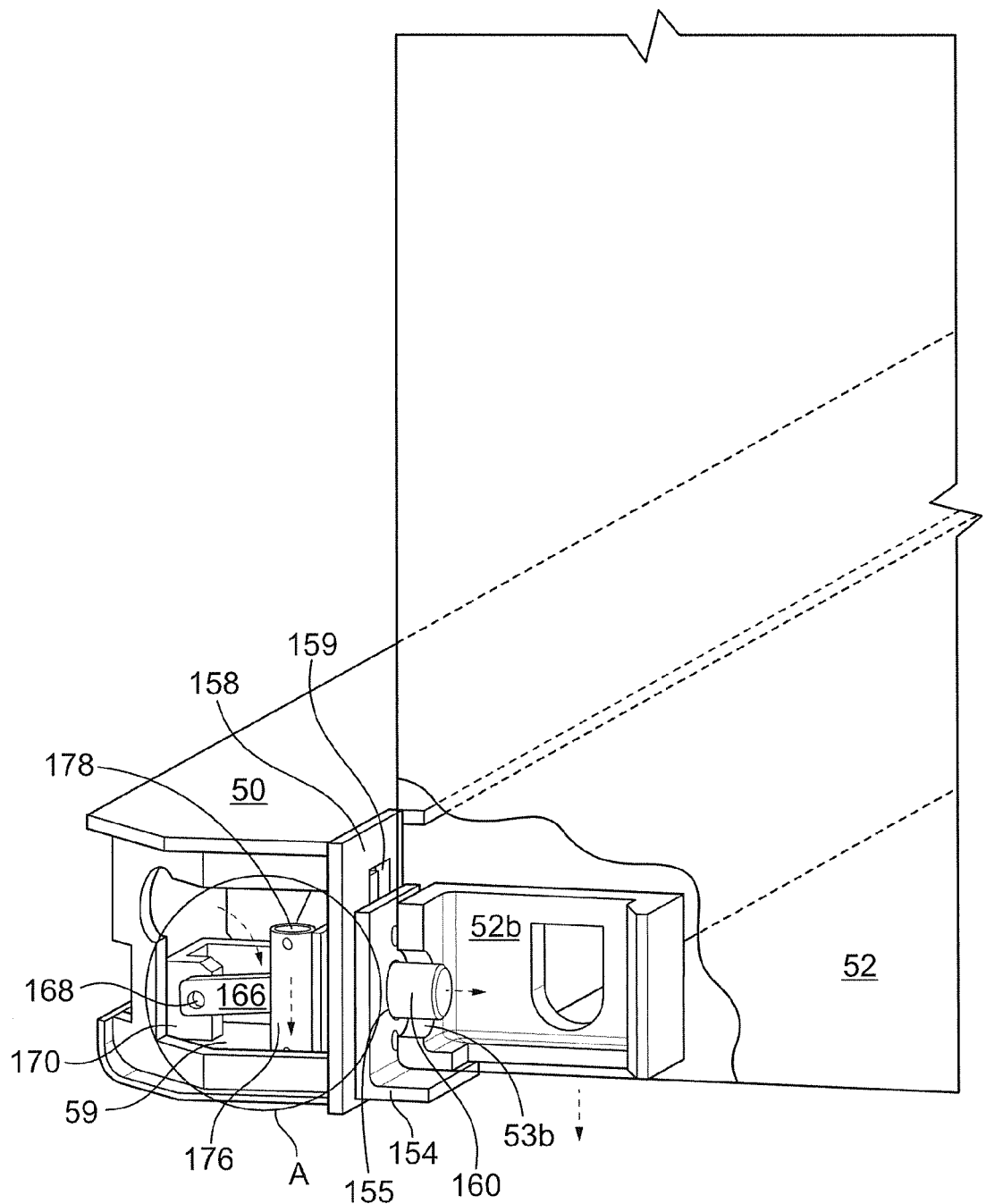
FIG. 10 is a front side isometric view of the front pin latching system of FIG. 8 in the second position.

Referring to FIG. 8, the shelf 154 rests in the first position when the container 52 is not loaded onto the container chassis 50. The shelf 154 rests in a second position when the container 52 is loaded on the container chassis 50 as shown in FIG. 10. Movement of the shelf 154 from the first position to the second position causes the pin 160 to extend outwardly from the container chassis 50. Best illustrated in FIG. 9, the pin 160 moves both vertically and horizontally between the first and second positions.

In this embodiment, the linkage mechanism 162 is operably coupled to the shelf 154 and the pin 160 so as to translate the vertical movement of the shelf 154 into horizontal movement of the pin 160 during placement of the container 52 on the container chassis 50. The plate 174 of the linkage mechanism 162 disposed on the inner surface 157 of the insert 158 is configured to move vertically with the shelf 154. A bore 173 on the plate 174 maintains the vertical position of the pin 160, as the pin 160 moves vertically with the plate 174. The pin 160 also moves horizontally through the bore 173 between the first and second positions. Horizontal movement of the pin 160 is effected by the link 166 of the linkage mechanism 162 during movement of the shelf 154.

Figure 11:
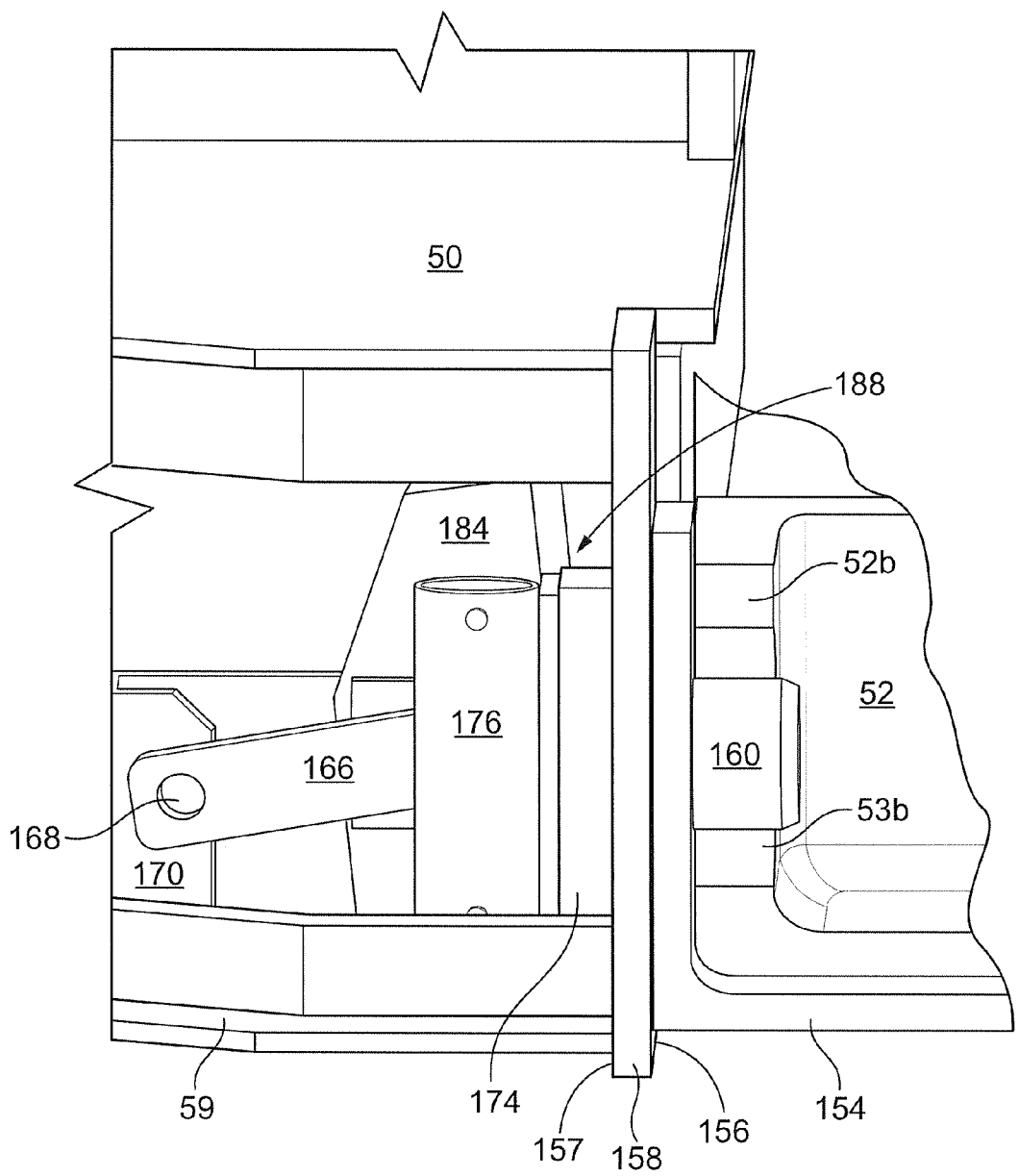
FIG. 11 is an enlarged, fragmentary isometric side view of Detail A of FIG. 10.

Most clearly shown in FIG. 11, the link 166 of the linkage mechanism 162 rotates about a pivot 168 mounted, welded, or otherwise secured to a portion 170 of the insert 158. An opposite end of the link 166 is operably coupled to the pin 160. The link 166 is dimensioned and positioned such that downward movement of the shelf 154 causes the link 166 to rotate about the pivot 168 and move the pin 160 horizontally through the adjacent openings 155, 159 of the shelf 154 and the insert 158, respectively.

Seen best in FIG. 8, the linkage mechanism 162 also includes the spring 172 biased against movement of the shelf 154. The spring 172 biases the shelf 154 into the first position as shown in FIG. 8. The spring housing 176 is secured to the plate 174. The spring 172 is compressed between the cover 178 (see FIG. 9) of the spring housing 176 and a bottom surface 59 of the container chassis 50.

Referring back to FIG. 7, the interlock assembly 152 may provide a fail-safe operation such that the first and second front pin latching systems 151a, 151b maintain securement of the container 52 to the container chassis 50. The rod 182 extends between the first and second front pin latching systems 151a, 151b. The first and second tabs 184a, 184b are coupled to the rod 182, and are disposed proximate to the respective the respective first and second front pin latching systems 151a, 151b. The tabs 184a, 184b may be bolted, pinned, or secured to the rod 182 by any suitable method. Additionally, the rod 182 may be a circular rod, a flat bar or plate, or a rod having a square or other geometrical cross section.

Figure 12:
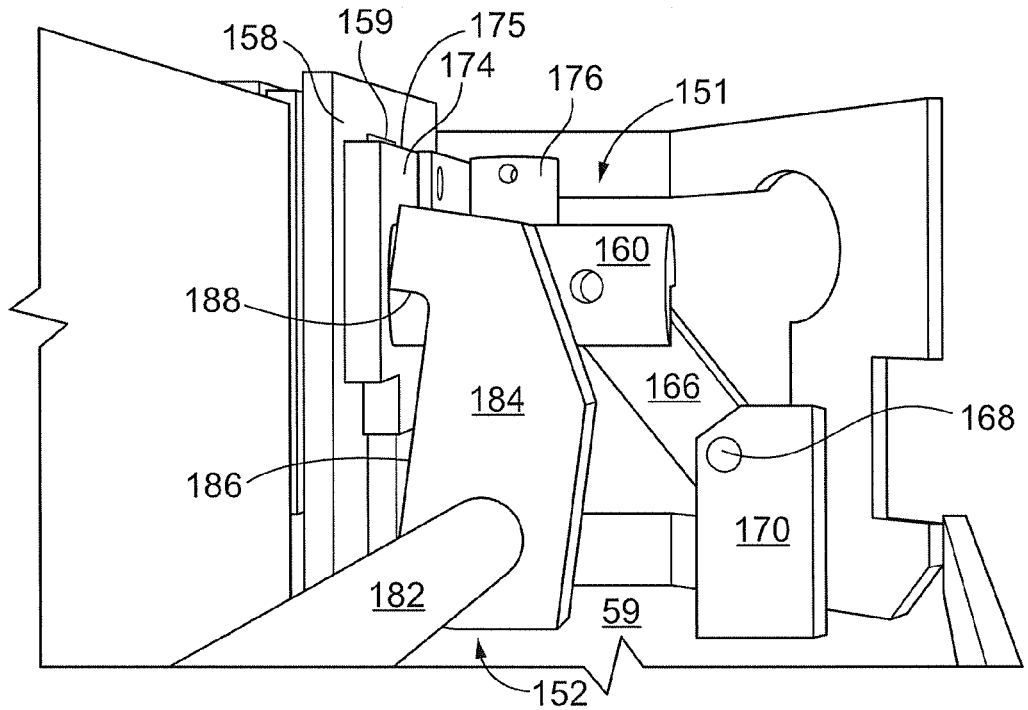
FIG. 12 is a fragmentary side view of an interlock assembly of the front pin latching arrangement in a first position.
Figure 13:
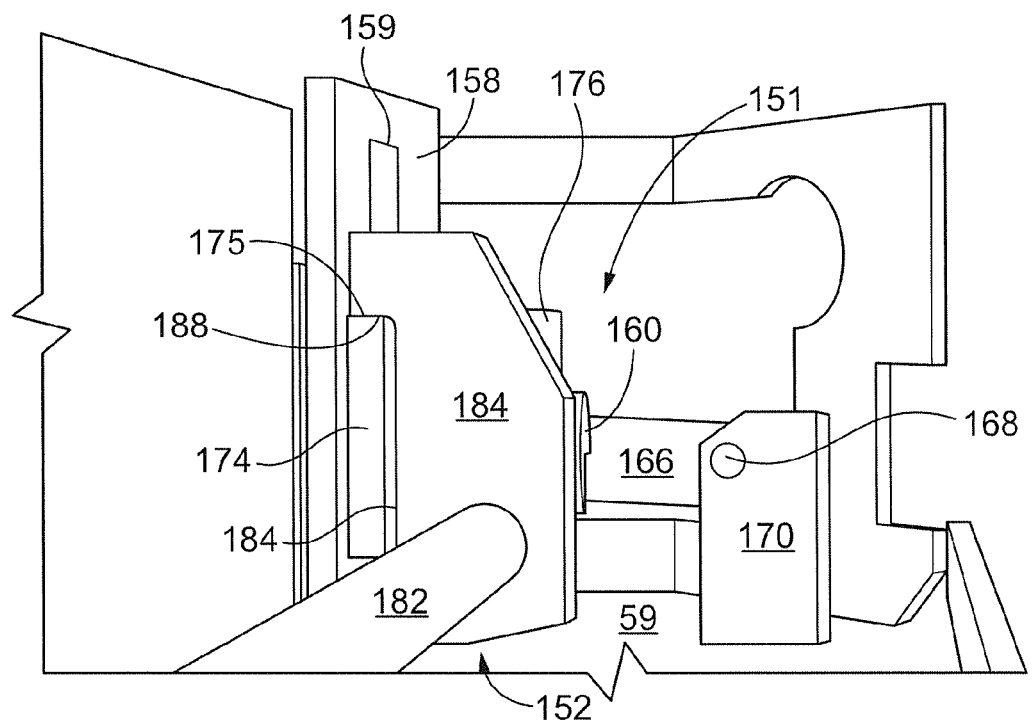
FIG. 13 is a side isometric view of the interlock assembly of the front pin latching arrangement of FIG. 12 in a second position.

As seen in FIG. 12, the tab 184 has a cam surface 186 adjacent the front pin latching system 151 such that the cam surface 186 follows movement of the front pin latching system 151 during placement of the container 52 on the container chassis 50. The tab 184 is disposed in a first position before placement of the container 52 on the container chassis 50. FIG. 13 shows the tab 184 disposed in a second position after placement of the container 52 on the container chassis 50. The rod 182 and tabs 184a, 184b rotate between the first and second positions upon movement of the first and second shelves 154a, 154b of the respective first and second front pin latching systems 151a, 151b.

More specifically, a hook portion 188 of the tab 184 is disposed against the plate 174 of the front pin latching system 151 in the first position shown in FIG. 12. As the plate 174 moves downward upon placement of the container 52 on the container chassis 50, the plate 174 contacts the cam surface 186 of the tab 184, causing the tab 184, and the rod 182 connected thereto, to rotate. In the second position shown in FIG. 13, the hook portion 188 of the tab 184 receives an upper edge 175 of the plate 174. The first and second tabs 184a, 184b in the second position provide a fail-safe to maintain the position of the respective first and second pins 160a, 160b of the respective first and second front pin latching systems 151a, 151b such that the container 52 remains secured to the container chassis 50.

Operation of the front pin arrangement 150 will now be described. In reference to FIG. 8, the shelf 154 of each front pin latching system 151 rests in the first position prior to placement of a container 52 on the container chassis 50. The pin 160 remains disposed within the insert 158. As the corner casting 52b of the container 52 is placed on the shelf 154, the shelf 154 moves downwardly into the second position. Such movement causes the link 166 to force the pin 160 outwardly from the insert 158, as seen in FIG. 9. Once the shelf 154 reaches the lowermost position shown in FIG. 10, the pin 160 fully extends from the shelf 154 into the opening 53b of the corner casting 52b.

Downward movement of the shelves 154a, 154b of the respective front pin latching systems 151a, 151b also causes the interlock assembly 152 to move between the first and second positions. As the plate 174 of the front pin latching system 151 moves downwardly upon placement of the container 52 on the container chassis 50, the plate 174 contacts the cam surface 186 of the tab 184 such that the tab 184 rotates. The hook portion 188 of the tab 184 captures the upper edge 175 of the plate 174 to prevent the plate 174, and the front pin latching system 151 connected thereto, from moving upwards.

When the container 52 is removed from the container chassis 50, the spring 172 of each front pin latching system 151 biases the plate 174 and the shelf 154 upwards, which causes the link 166 to rotate about the pivot 168. Rotation of the link 166 causes the pin 160 to move horizontally into the insert 158. Upward movement of the plate 174 also causes the cam surface 186 of the tab 184 to rotate away from the plate 174, thereby enabling the spring 172 to bias the upper edge 175 of the plate 174 against hook portion 188 of the tab 184.

Latching Arrangement 200

Figure 14:
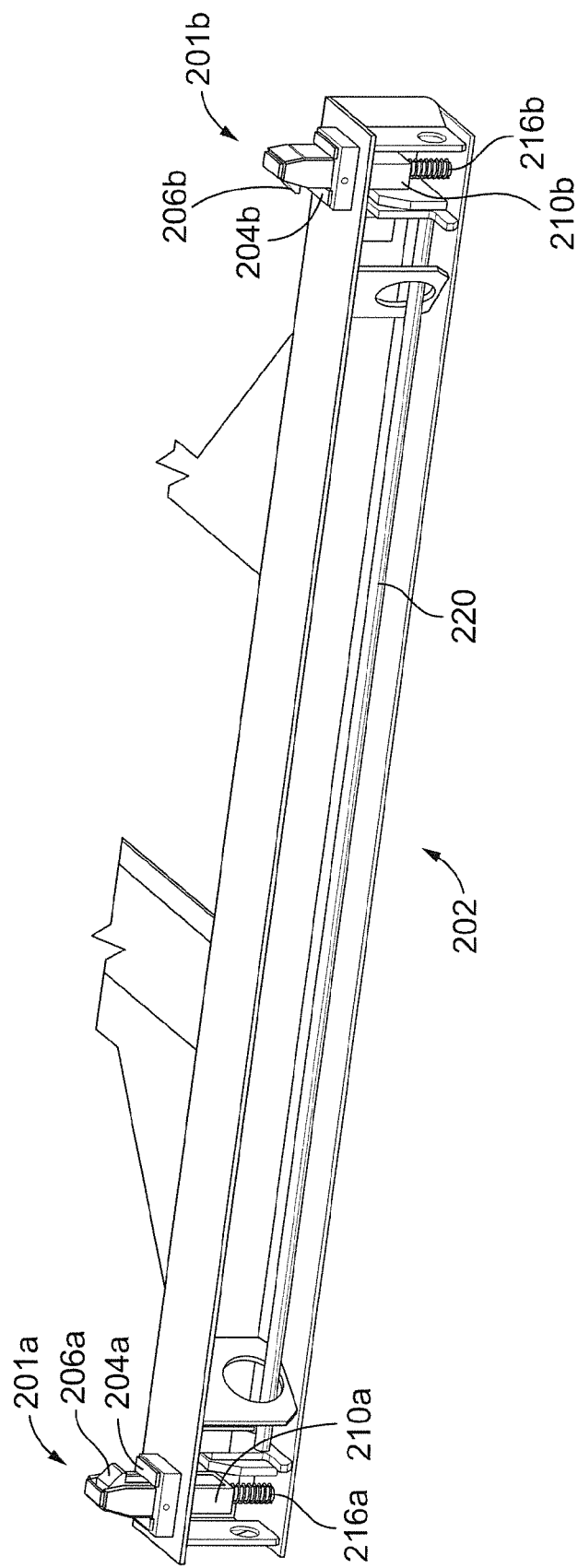
FIG. 14 is a rear isometric view of an alternative embodiment of the latching arrangement.

Referring to FIG. 14, an alternative embodiment latching arrangement 200 is provided. In this embodiment, the latching arrangement 200 includes a first latching system 201a and a second latching system 201b spaced apart at each of the two rear corners of the container chassis 50. An interlock assembly 202 is positioned between the first and second latching systems 201a, 201b. When a container 52 is loaded onto the container chassis 50 (see FIG. 17B), each rear corner casting 52a depresses an actuation device 204 (see FIG. 15A) of each latching system 201. Depression of the actuation device 204 causes a latch 206 to move between an unlatched position of FIG. 15A to a latched position of FIG. 17A such that the container 52 is secured to the container chassis 50. The interlock assembly 202 seen in FIG. 14 provides a fail-safe operation to ensure that the first and second latches 206a, 206b of the respective first and second latching systems 201a, 201b remain in the latched position.

Figure 15A:
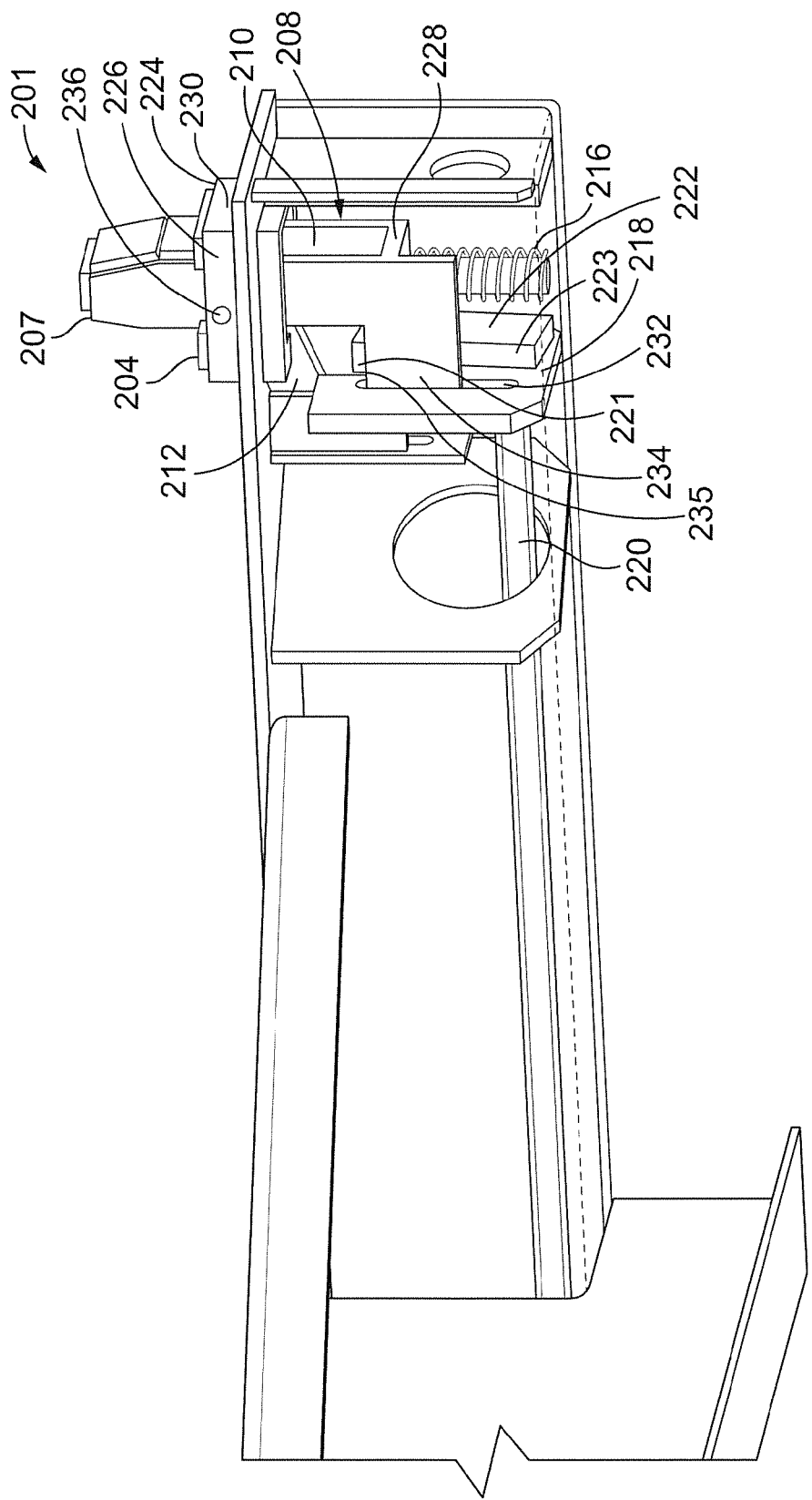
FIG. 15A is a front isometric view of an alternative embodiment of the latching system in an unlatched position.
Figure 15B:
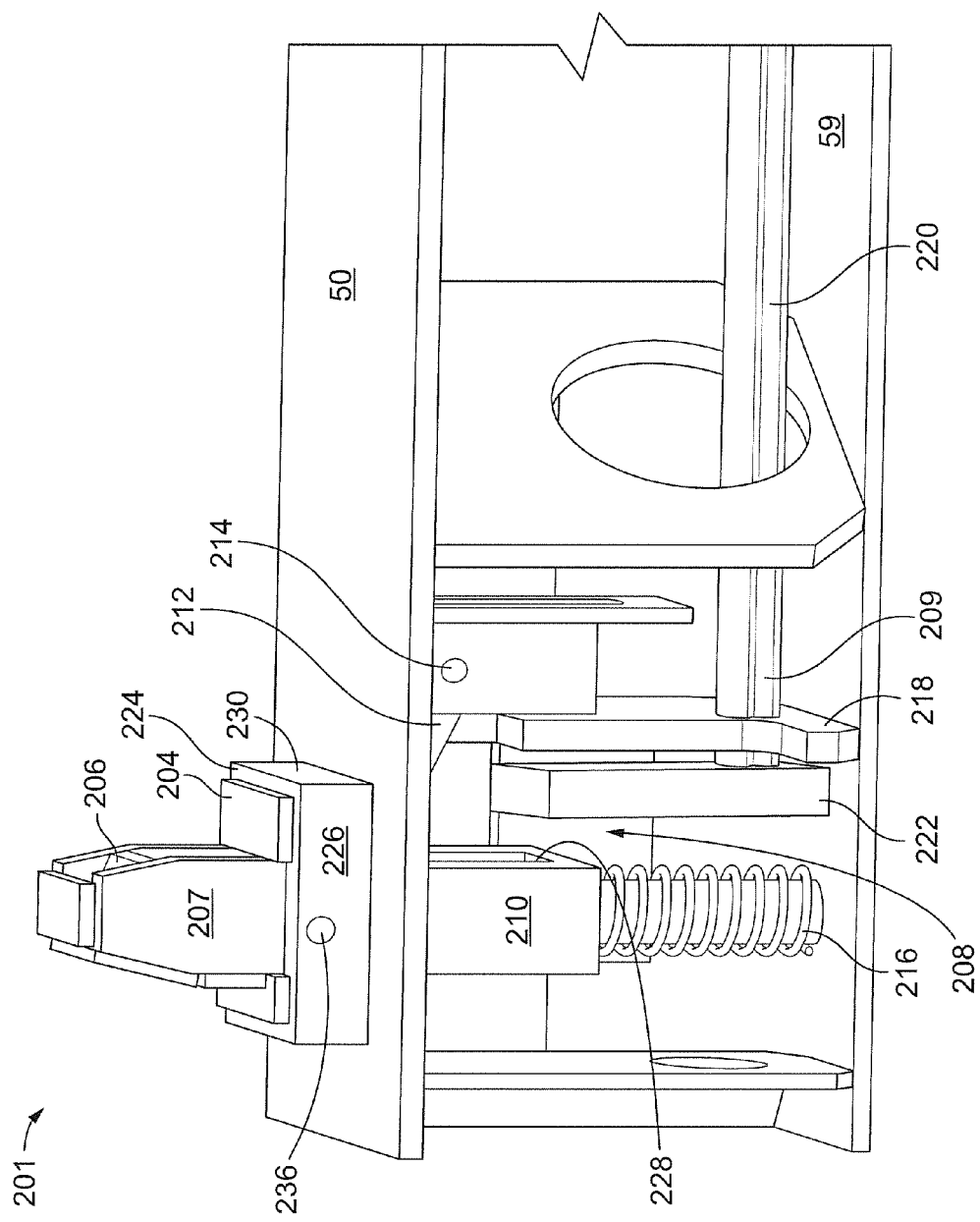
FIG. 15B is a rear isometric view of the alternative embodiment of the latching system of FIG. 15A in an unlatched position.

As shown in FIG. 15A, each latching system 201 includes the actuation device 204, the latch 206 (see FIG. 15C) positioned within a latch housing 207, and a linkage mechanism 208. The linkage mechanism 208, in this example, includes a structure 210, a link 212 that rotates about a link pivot 214, a spring 216, and a plate 218. In this example embodiment, the interlock assembly 202 includes a rod 220, a first tab 222a adjacent the first latching system 201a, a second tab 222b adjacent the second latching system 201b. FIG. 15B shows the latching system 201 from another perspective.

Figure 15C:
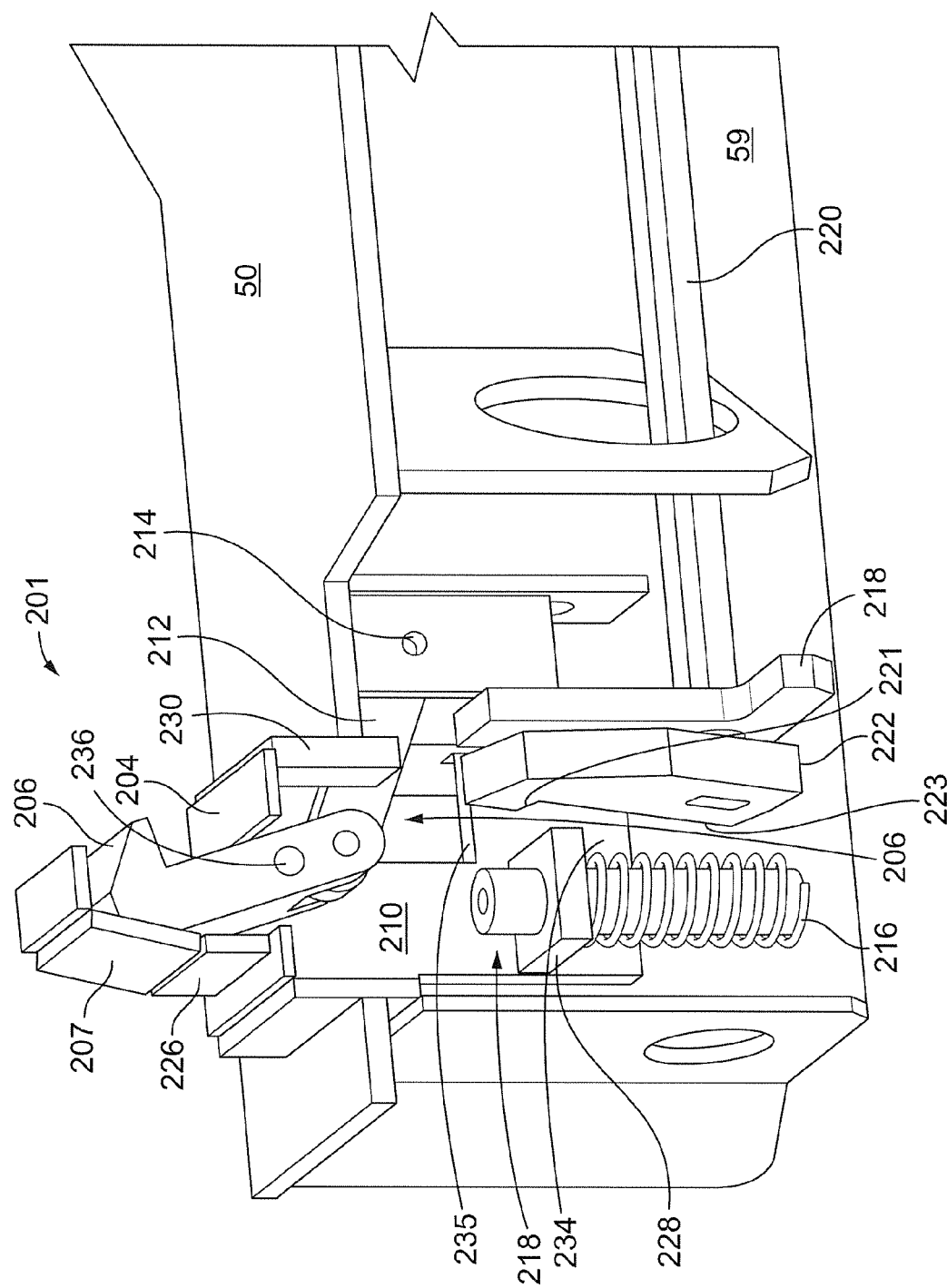
FIG. 15C is a partial rear isometric view of the alternative embodiment of the latching system of FIG. 15A in an unlatched position.

In this example embodiment, the actuation device 204 is an upper surface 224 of a box 226 that receives the structure 210 of the linkage mechanism 208. The structure 210 extends through a surface 54 of the container chassis 50. Referring to FIG. 15C, an inner face 230 of the box 226 has an inverted U-shape that extends downwardly on either side of the link 212 of the linkage mechanism 208. Shown in FIG. 15A, the plate 218 is mounted or otherwise secured to a bottom surface 59 of the container chassis 50. A guide slot 232 within the plate 218 receives an extension 234 of the structure 210 to provide further control over movement of the structure 210 between the latched and unlatched positions. Finally, the structure 210 also includes a bottom surface 228 parallel to the upper surface 224 of the box 226 against which the spring 216 is biased.

The latch housing 207 is disposed on top of the box 226 of the structure 210. The latch 206 extends through the box 226 and rotates about a latch pivot 236 mounted within the latch housing 207. Downward movement of the structure 210 due to placement of the container 52 on the container chassis 50 results in downward movement of the latch housing 207, the actuation device 204, and the structure 210.

The linkage mechanism 208 translates the vertical movement of the actuation device 204 into rotational movement of the latch 206 about the latch pivot 236. The link 212 of the linkage mechanism 208 is operably coupled to the link pivot 214 secured to the container chassis 50. At an opposite end, the link 212 is operably coupled to the latch 206. The inner face 230 of the box 226 straddles the link 212 at a midpoint of the link 212 as seen best in FIG. 17B. The spring 216 biases the actuation device 204 against placement of the container 52 onto the container chassis 50. Actuation of the actuation device 204 (i.e., downward movement of the box 226) causes the link 212 to rotate about the link pivot 214, which causes the latch 206 to rotate about the latch pivot 236 into the latched position (see FIG. 17A).

As seen in FIGS. 15A, 15B, and 15C, the actuation device 204 is disposed above the surface 54 of the container chassis 50 in the unlatched position.

Figure 16:
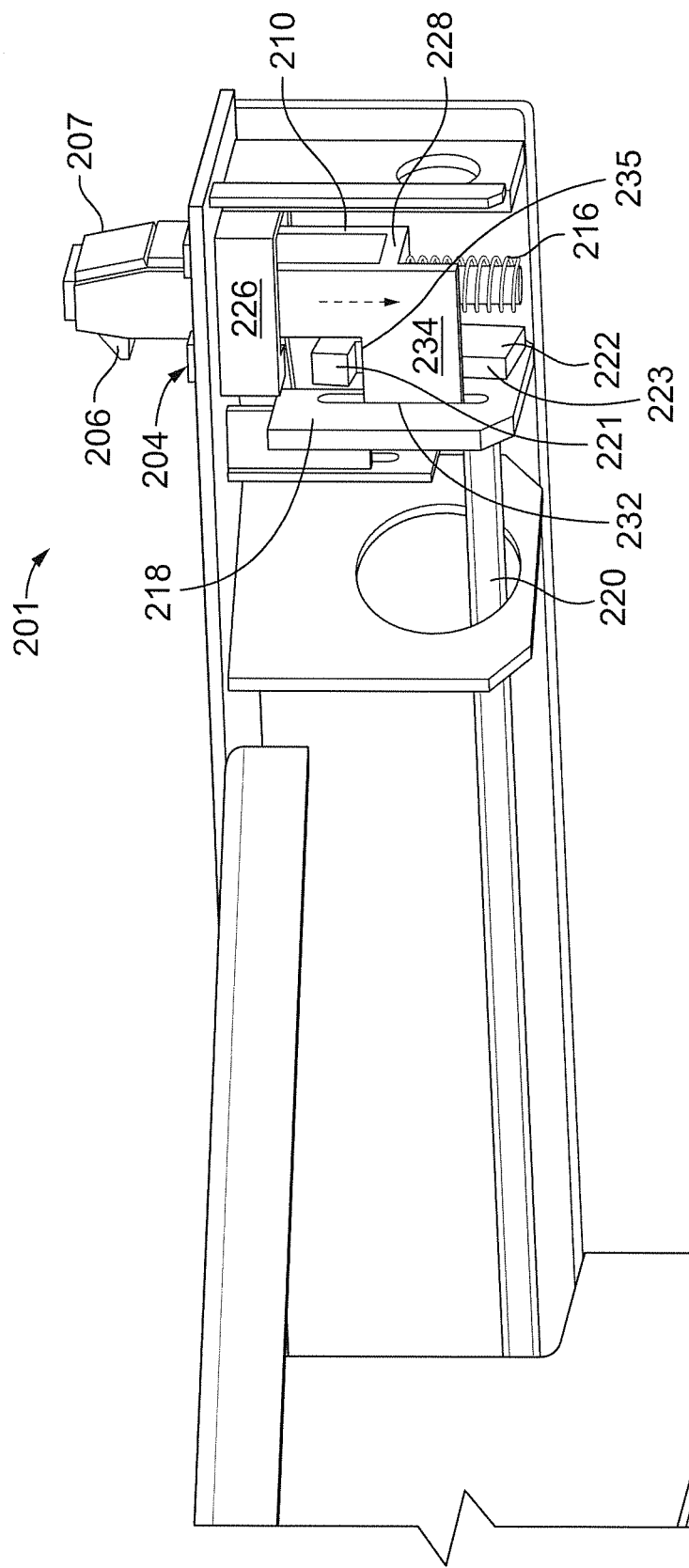
FIG. 16 is a front isometric view of the alternative embodiment of the latching system in a partially latched position.

FIG. 16 illustrates the latching system 201 moving between the latched and unlatched positions. The extension 234 of the structure 210 is at a midpoint within the guide slot 232 of the plate 218, and the latch 206 has extended partially from the latch housing 207.

Figure 17A:
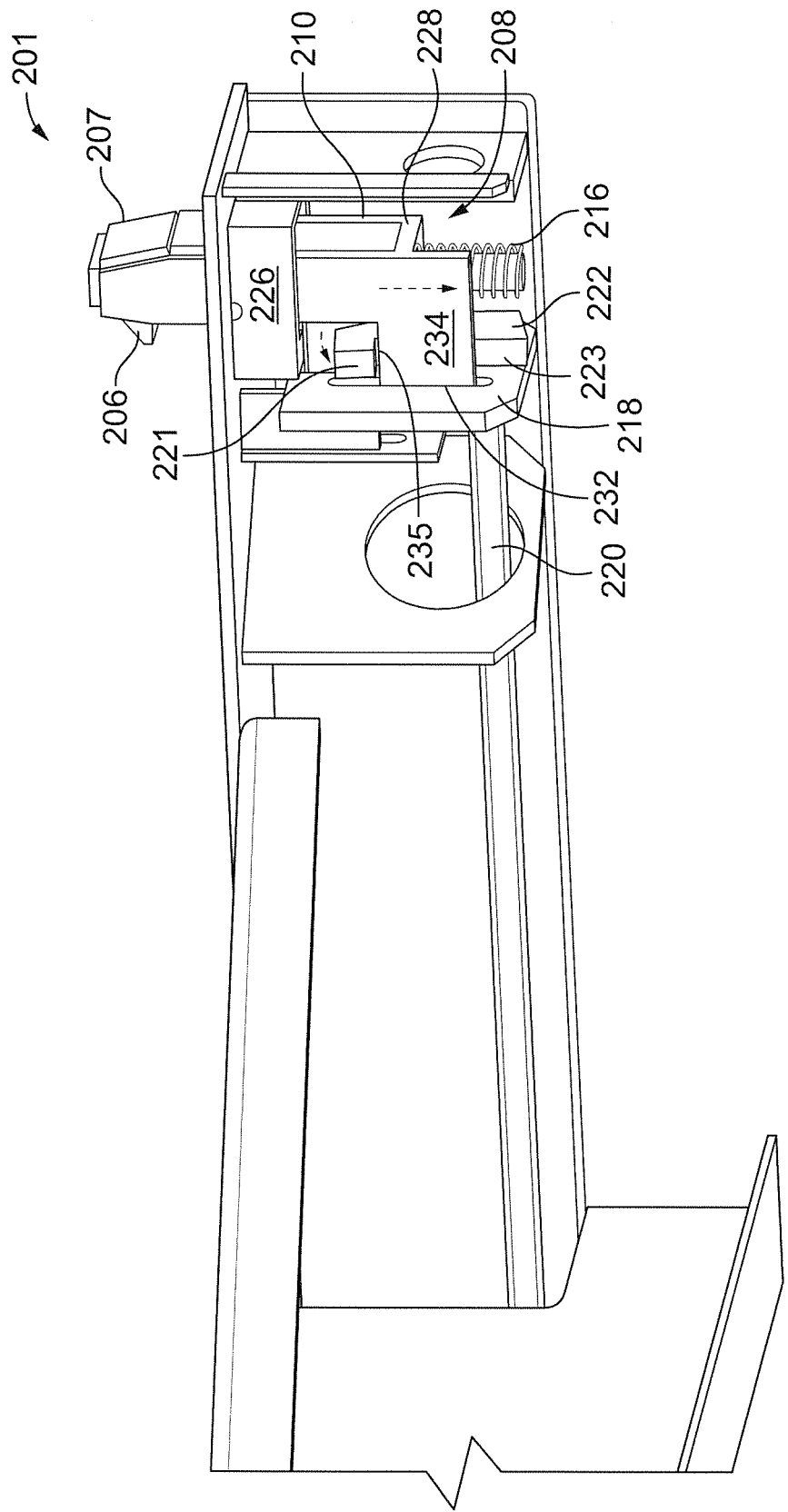
FIG. 17A is a front isometric view of the alternative embodiment of the latching system in a latched position.
Figure 17B:
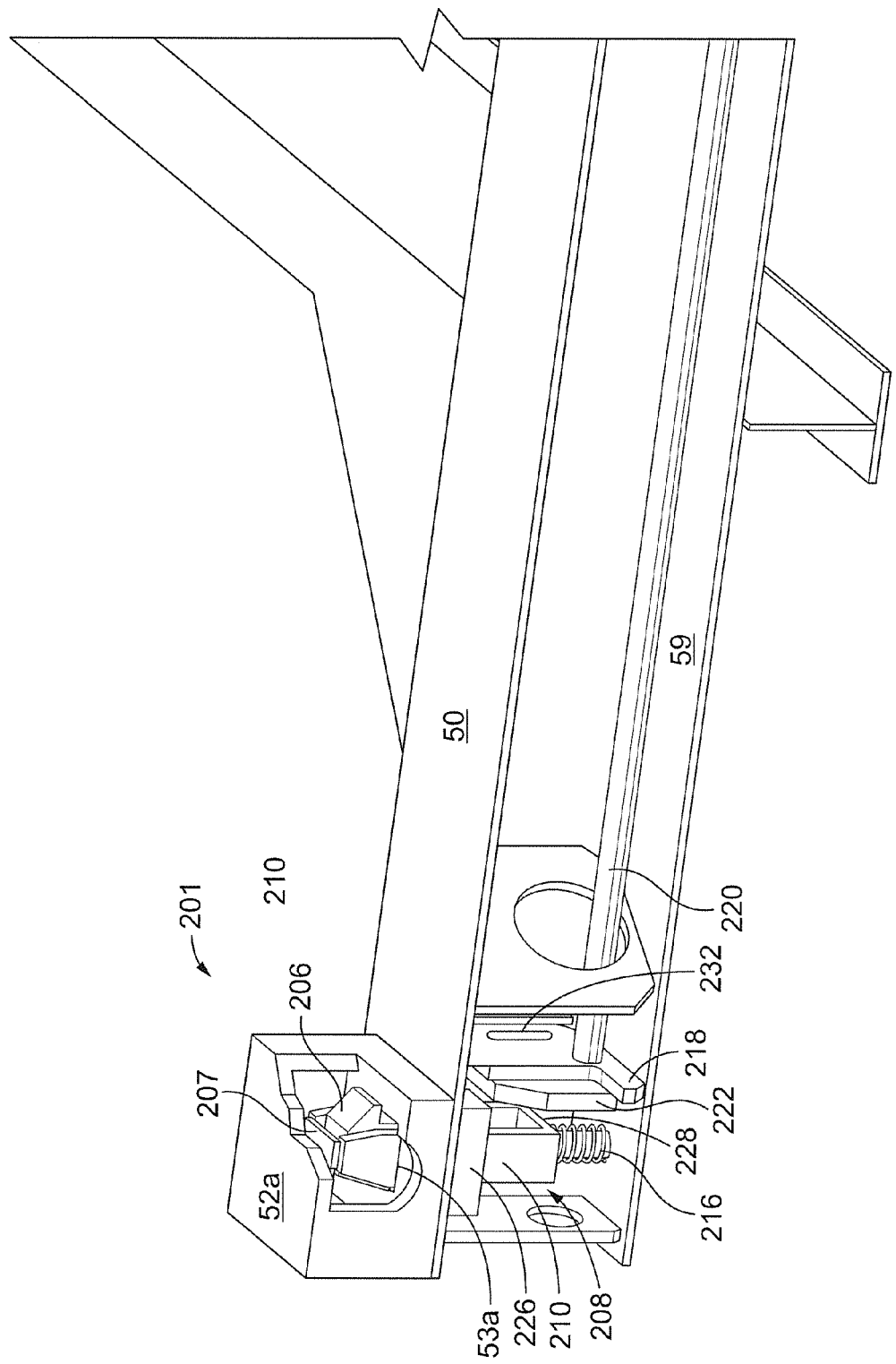
FIG. 17B is a rear isometric view of the alternative embodiment of the latching system of FIG. 17A in a latched position.
Figure 17C:
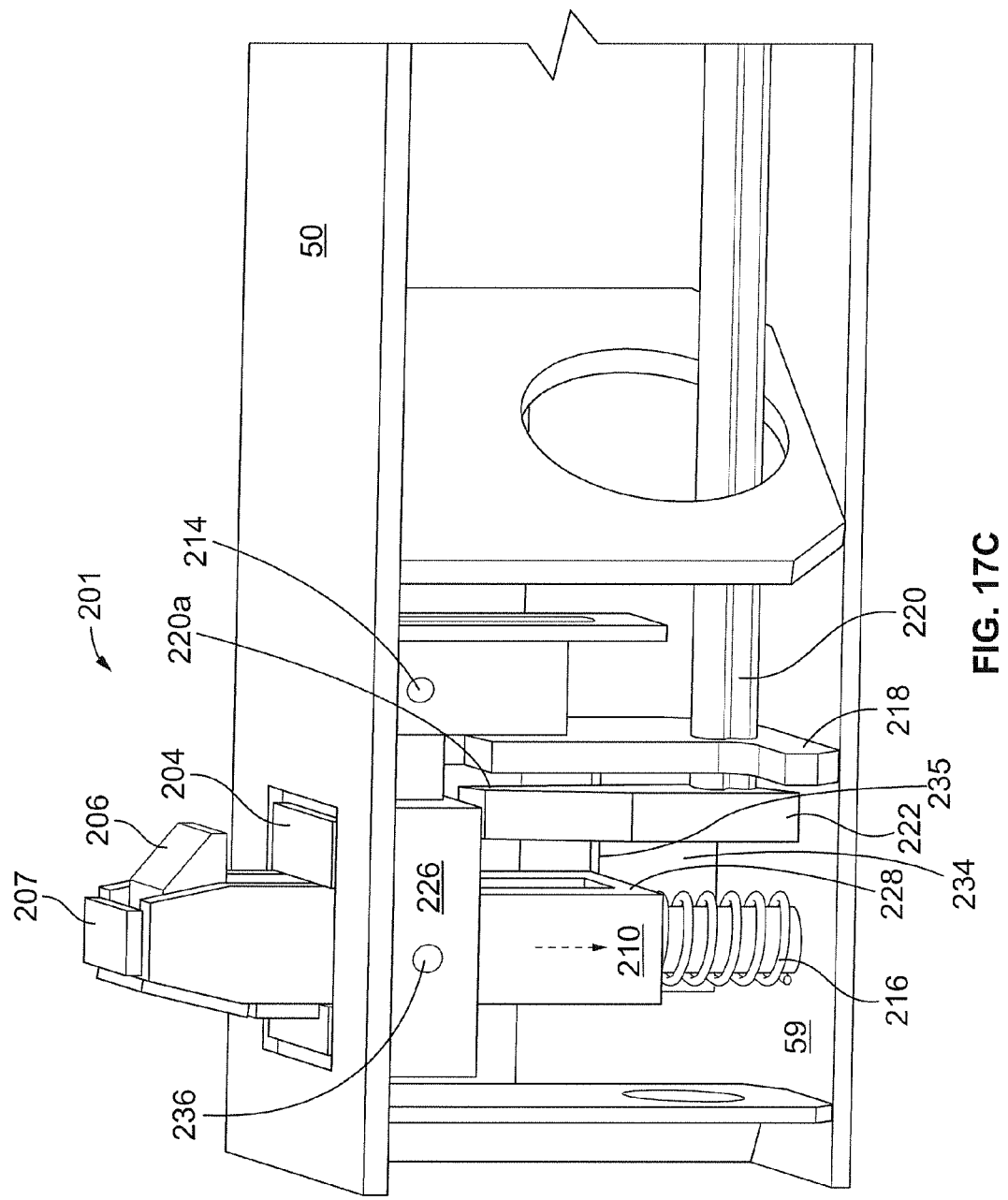
FIG. 17C is a rear isometric view of the alternative embodiment of the latching system of FIG. 17A in a latched position.
Figure 17D:
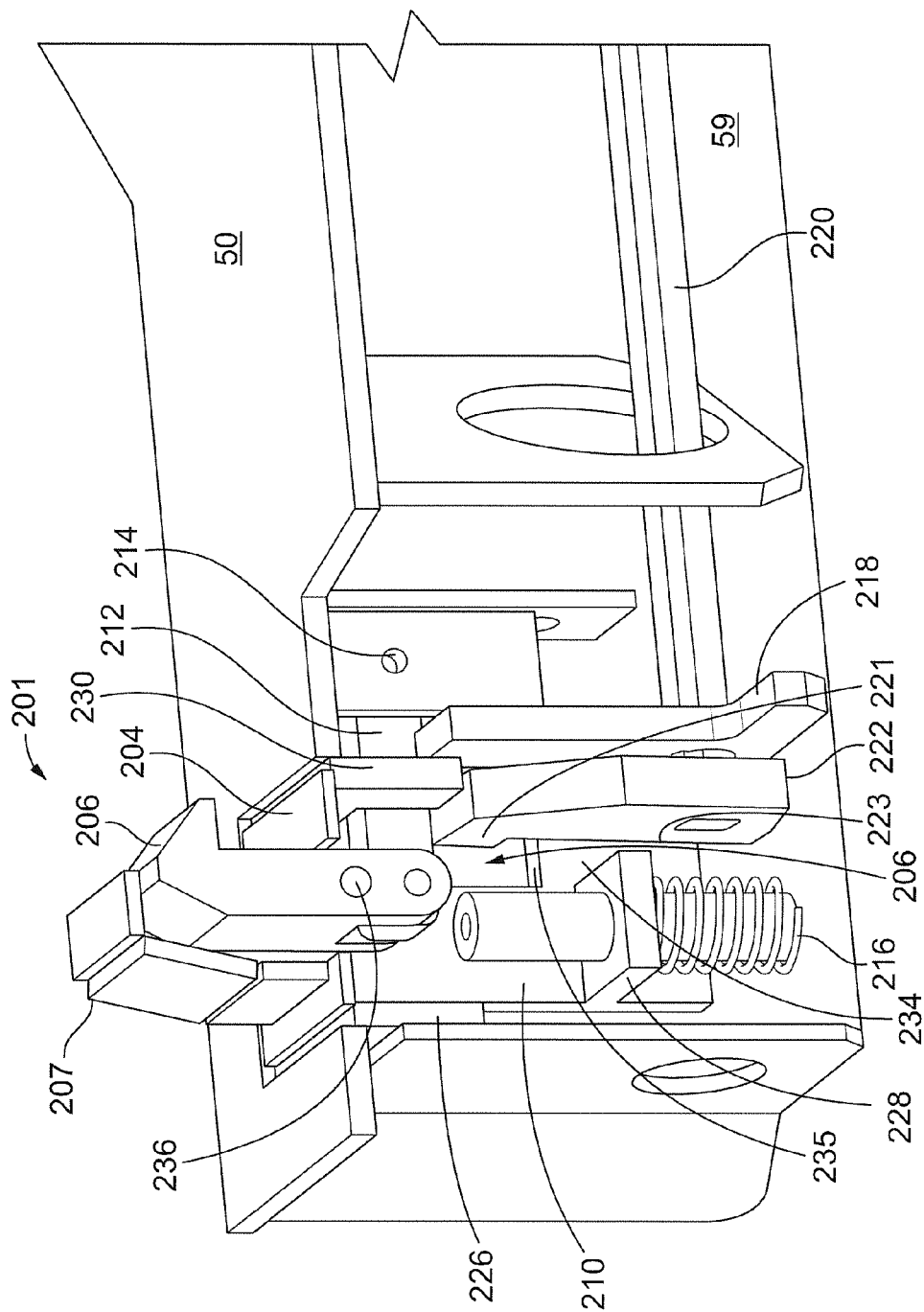
FIG. 17D is a partial rear isometric view of the alternative embodiment of the latching system in a latched position

Referring to FIG. 17A, the latching system 201 is shown in the latched position. The actuation device 204 is level with the surface 54 of the container chassis 50. The latch 206 extends fully from the latch housing 207.

Referring again to FIG. 14, the interlock assembly 202 operates similarly to the interlock assembly 152 of the front pin latching arrangement 150. The rod 220 of the interlock assembly 202 has first and second tabs 222a, 222b positioned adjacent respective first and second latching systems 201a, 201b. Upon movement of the first and second actuation devices 204a, 204b of the respective first and second latching systems 201a, 201b, the rod 220 and tabs 222a, 222b rotate between an unlatched position shown in FIG. 15C and a latched position shown in FIG. 17A. In the latched position, the first and second tabs 222a, 222b maintain the position of the extensions 234a, 234b, and the other components of the latching systems 201a, 201b connected thereto, such that the latches 206a, 206b are held in the latched position and the container 52 remains secured to the container chassis 50. The rod 220 may be a flat bar or plate, a circular rod, or a rod having a square or other geometrical cross section.

More specifically, a hook portion 221 of the tab 222 is disposed against the extension 234 of the structure 210 of each latching system 201a, 201b in the unlatched position shown in FIG. 15C. As the structure 210 moves downward upon placement of the container 52 on the container chassis 50, the extension 210 pushes a lower surface 223 of the tab 222, causing the tab 222 to rotate. In the latched position shown in FIG. 17A, the hook portion 221 of the tab 222 receives an upper edge 235 of the extension 234. In addition, the interlock rod 220 extends through each tab 222a, 222b. The rod 222 and the tabs 222a, 222b may be welded together or made from the same mold Tabs are bolted to the rod.

Operation of the latching arrangement 200 will now be described. FIGS. 15A, 15B, and 15C show the latching system 201 in the unlatched position. The actuation device 204, in this example, extends upwards from the surface of the container chassis, and the latch 206 remains within the latch housing 207. The tab hook 221 of the tab 222 rests against the extension 234. In FIG. 16, the latching system 201 is shown in a partial latched position. The latch housing 207 enters the hole 53a (shown in FIG. 17B) of the corner casting 52a while a bottom surface of the corner casting 52a depresses the actuation device 204. This depression rotates the link 212 of the linkage mechanism 208 about the link pivot 214, which causes the latch 206 to rotate about the latch pivot 236 and extend from the latch housing 207. This depression also causes the extension 234 of the structure 210 of the latching system 201 to move downward and contact the lower surface 223 of the tab 222 such that the tab 222 and the rod 220 connected thereto rotates. Referring to the latched position shown in FIGS. 17A-D, the latch 206 is fully extended from the latch housing 207 and the actuation device 204 is fully depressed. The tab hook 221 of the tab 222 captures the upper edge 235 of the extension 234 to prevent the extension 234, and the latching system 201 connected thereto, from moving upwards.

Latching Arrangement 250

Figure 18A:
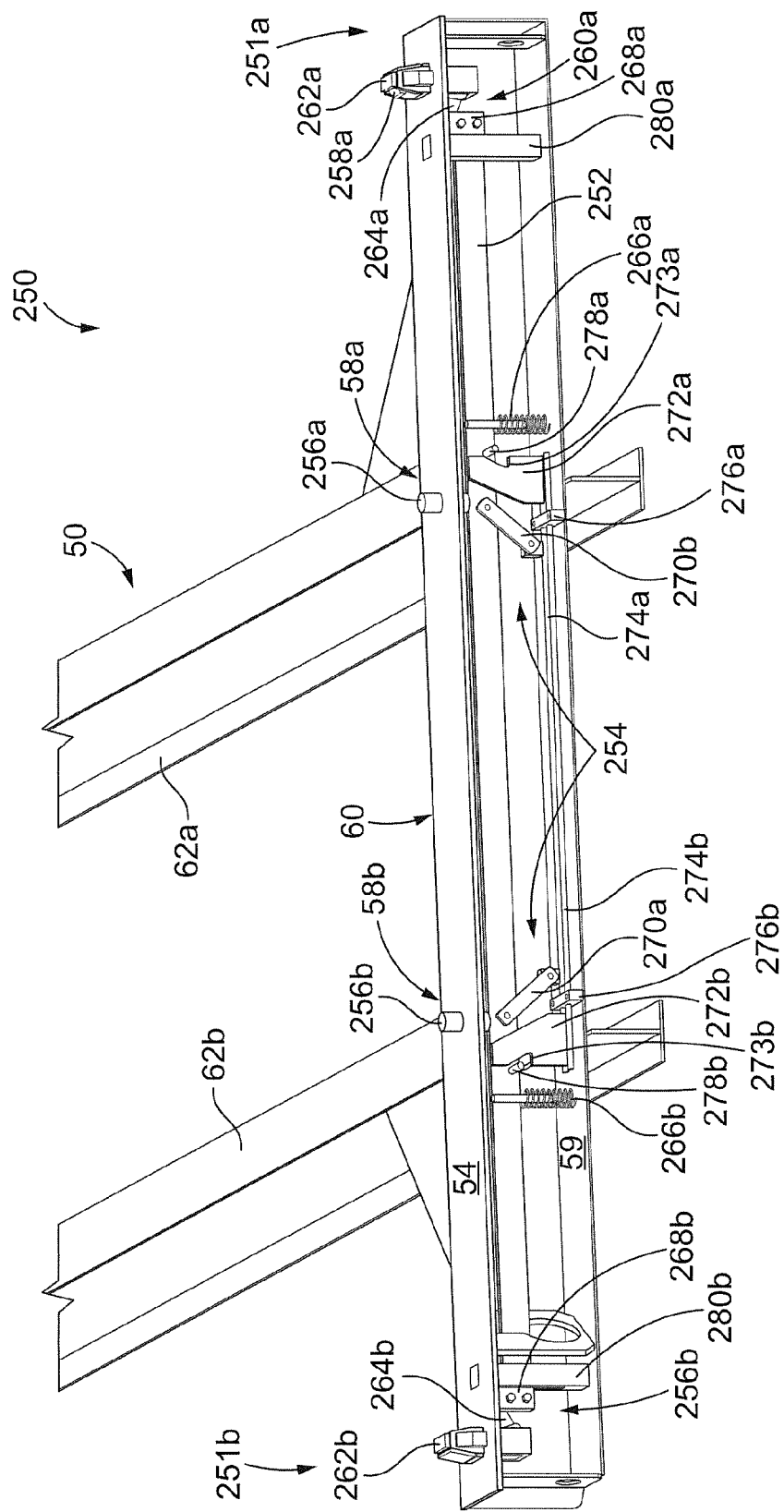
FIG. 18A is a rear isometric view of a second alternative embodiment of the latching arrangement in an unlatched position.

Referring to FIG. 18A, another alternative embodiment latching arrangement 250 is provided. The latching arrangement 250, in this example embodiment, includes a first latching system 251a and second latching system 251b spaced apart at each of the two rear corners of the container chassis 50, a bar 252 extending between the first and second latching systems 251a, 251b, and an interlock assembly 254 positioned below the rod. When a container 52 is loaded onto the container chassis 50 (see FIG. 19C), the container 52 depresses a first actuation device 256a and a second actuation device 256b of the respective first and second latching systems 251a, 251b. Depression of the actuation devices 256a, 256b causes first and second latches 258a, 258b to move between an unlatched position of FIG. 18A to a latched position of FIG. 19A such that the container 52 is secured to the container chassis 50. In this embodiment, the interlock assembly 254 provides a fail-safe operation to ensure that the first and second latches 258a, 258b of the respective first and second latching systems 251a, 251b remain in the latched position.

In the example shown in FIG. 18A, the bar 252 comprises a flat bar or plate, although other embodiments may utilize a rod having a curved, square, or any geometrical cross section.

Referring to FIG. 18A, each latching system 251a, 251b includes the actuation device 256, a linkage mechanism 260, and the latch 258 (see FIG. 19A) disposed on a latch pivot (not shown) within a latch housing 262. The linkage mechanism 260, in this example, includes a link 264, a spring 266, and a structure 268. The interlock assembly 254, in this example, includes first and second arms 270a, 270b, first and second plates 272a, 272b, first and second interlock rods 274a, 274b, and first and second guides 276a, 276b.

The first and second actuation devices 256a, 256b are positioned along a rear portion of the container chassis 50, spaced apart from one another as well as from the respective first and second latching systems 251a, 251b. In the example embodiment shown in FIG. 18A, the first and second actuation devices 256a, 256b are located at the respective first and second junctures 58a, 58b of a rear portion 60 of the container chassis 50 and respective first and second main beams 62a, 62b extending perpendicular from the rear portion 60.

Figure 18B:
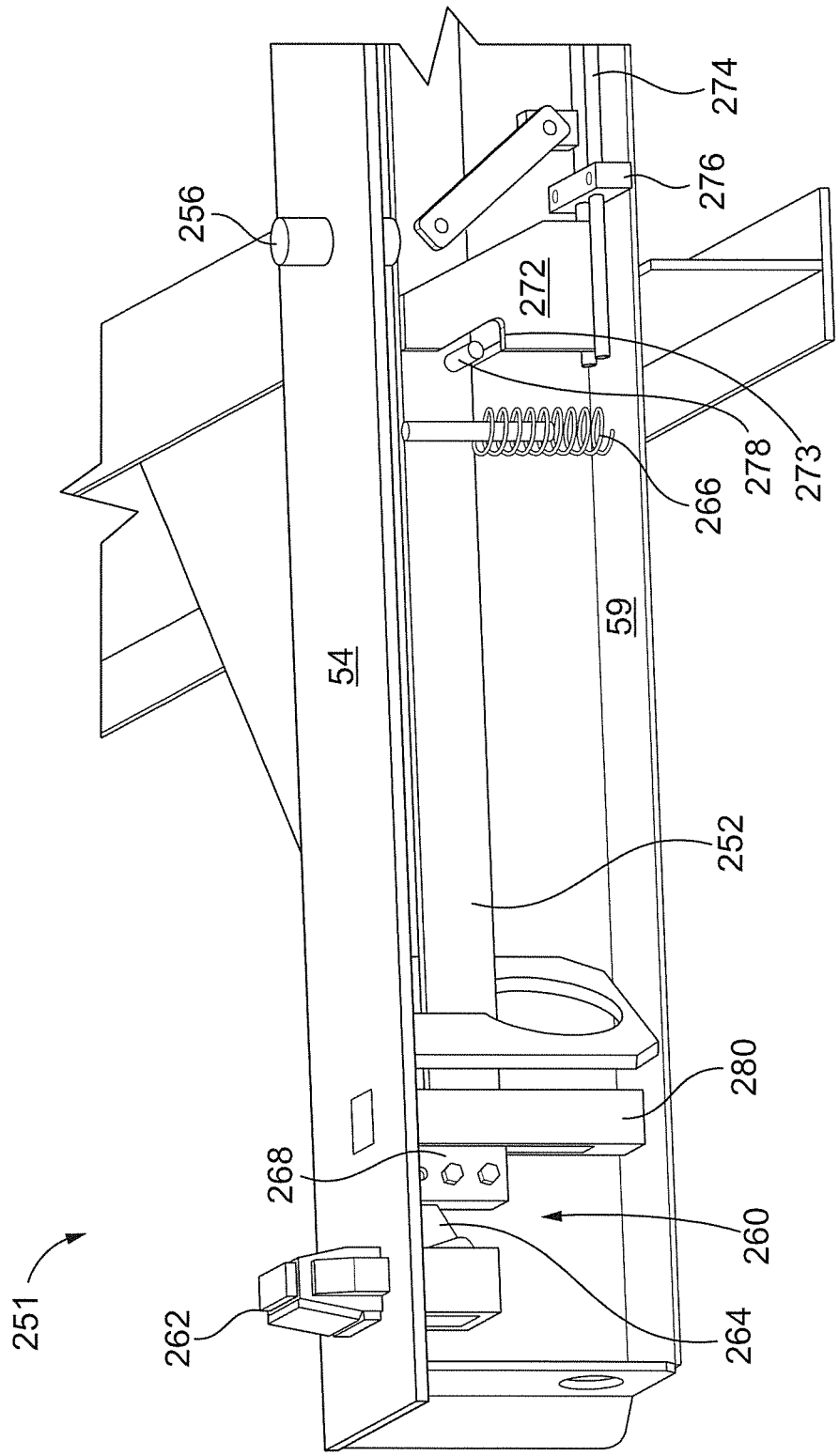
FIG. 18B is a rear isometric view of a second alternative embodiment of latching system in an unlatched position.

As seen in FIG. 18B, the linkage mechanism 260 of the latching system 251 translates the vertical movement of the actuation device 256 into rotational movement of the latch 258 about the latch pivot. The first and second actuation devices 256a, 256b extend upward from the bar 252 such that downward movement of the actuation devices 256a, 256b causes downward movement of the bar 252. The first and second links 264a, 264b of the respective first and second linkage mechanisms 260a, 260b are operably coupled to respective first and second structures 268a, 268b at opposite ends of the bar 252. The first and second links 264a, 264b are also operably coupled to the respective first and second latches 258a, 258b of the respective first and second latching systems 251a, 251b.

The spring 266 of each latching system 251a, 251b disposed between the bar 252 and a bottom surface 56 of the container chassis 50 biases the actuation device 256 against placement of the container 52 onto the container chassis 50. Actuation of each actuation device 256 (i.e., downward movement of the bar 252) causes the latch 258 to rotate about the latch pivot into the latched position (see FIG. 19A). The bar 252 extends through first and second rod guides 280a, 280b adjacent respective first and second latching systems 251a, 251b to provide control over movement of the bar 252.

Figure 19A:
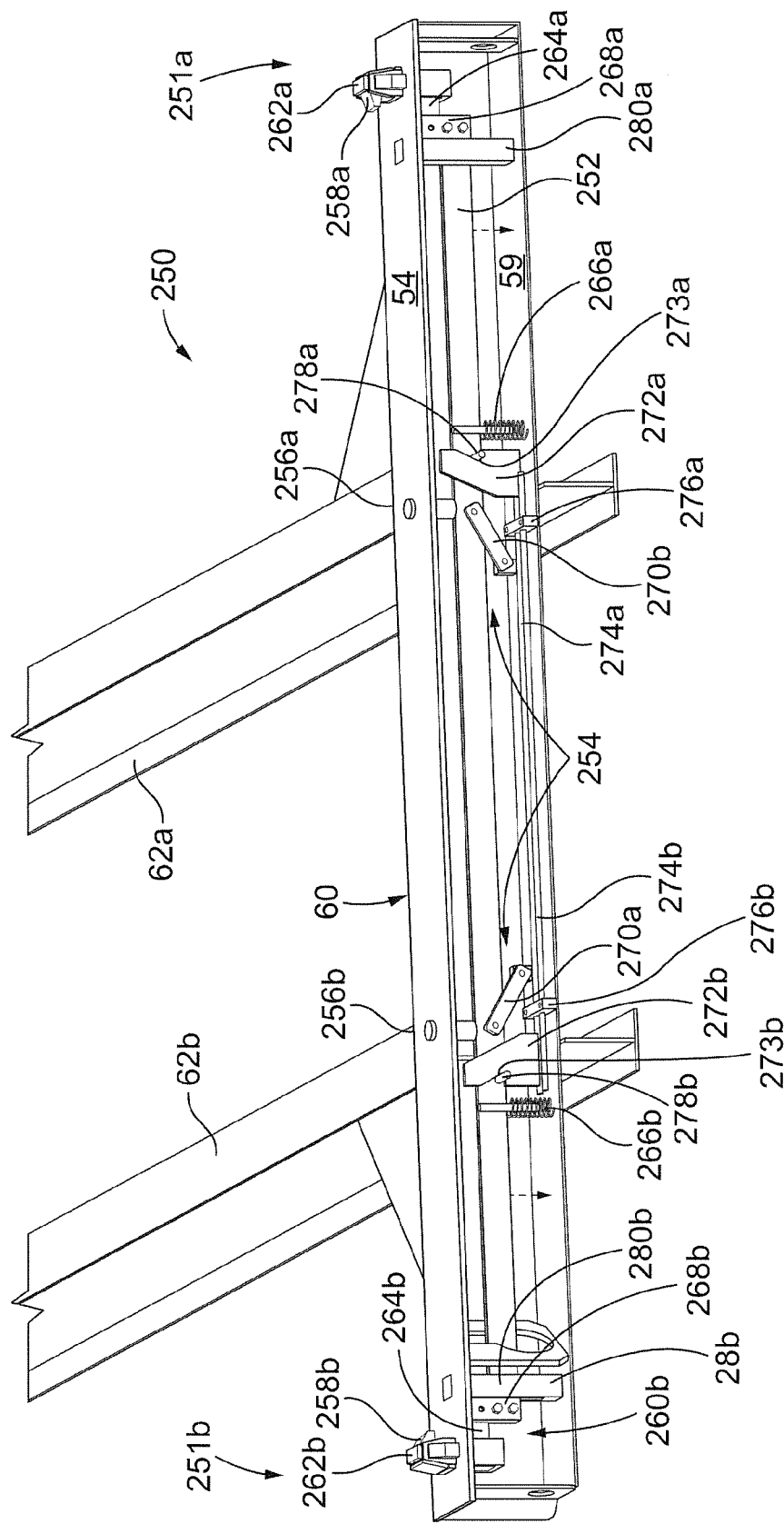
FIG. 19A is a rear isometric view of the second alternative embodiment of latching arrangement in a latched position.

FIG. 19A illustrates the latching arrangement 251 in the latched position. The actuation device 256 is depressed relative to the surface 54 of the container chassis 50, which causes the latch 258 to extend fully from the latch housing 262. The actuation device 256 is depressed by movement of the bottom of the container 52 or a cross brace between corner castings 52a-1, 52a-2. Operation of the latching system 251 is described in greater detail below.

Referring again to FIG. 18A, the interlock assembly 254 interacts with the first and second latching systems 251a, 251b. The first and second interlock rods 274a, 274b are positioned adjacent one another and move horizontally in opposite directions through the first and second guides 276a, 276b. At a first end of the first and second interlock rods 274a, 274b, respective first and second arms 270a, 270b connect the respective first and second interlock rods 274a, 274b to the bar 252. At a second end of the first and second interlock rods 274a, 274b, the first and second plates 272a, 272b are secured thereto adjacent respective first and second latching systems 251a, 251b. Each plate 272a, 272b has a notch 273 sized to receive one of first and second protrusions 278a, 278b that extend horizontally from the bar 252. Downward movement of the bar 252 causes the first and second arms 270a, 270b to move the respective first and second interlock rods 274a, 274b toward the respective first and second latching systems 251a, 251b. The first and second notches 273a, 273b of the respective first and second plates 272a, 272b receive respective first and second protrusions 278a, 278b of the bar 252 in the latched position as shown in FIG. 19A. The interaction of the plates 272a, 272b with the protrusions 278a, 278b restricts movement of the bar 252 in any direction, thereby ensuring securement of the container 52 to the container chassis 52.

Figure 19B:
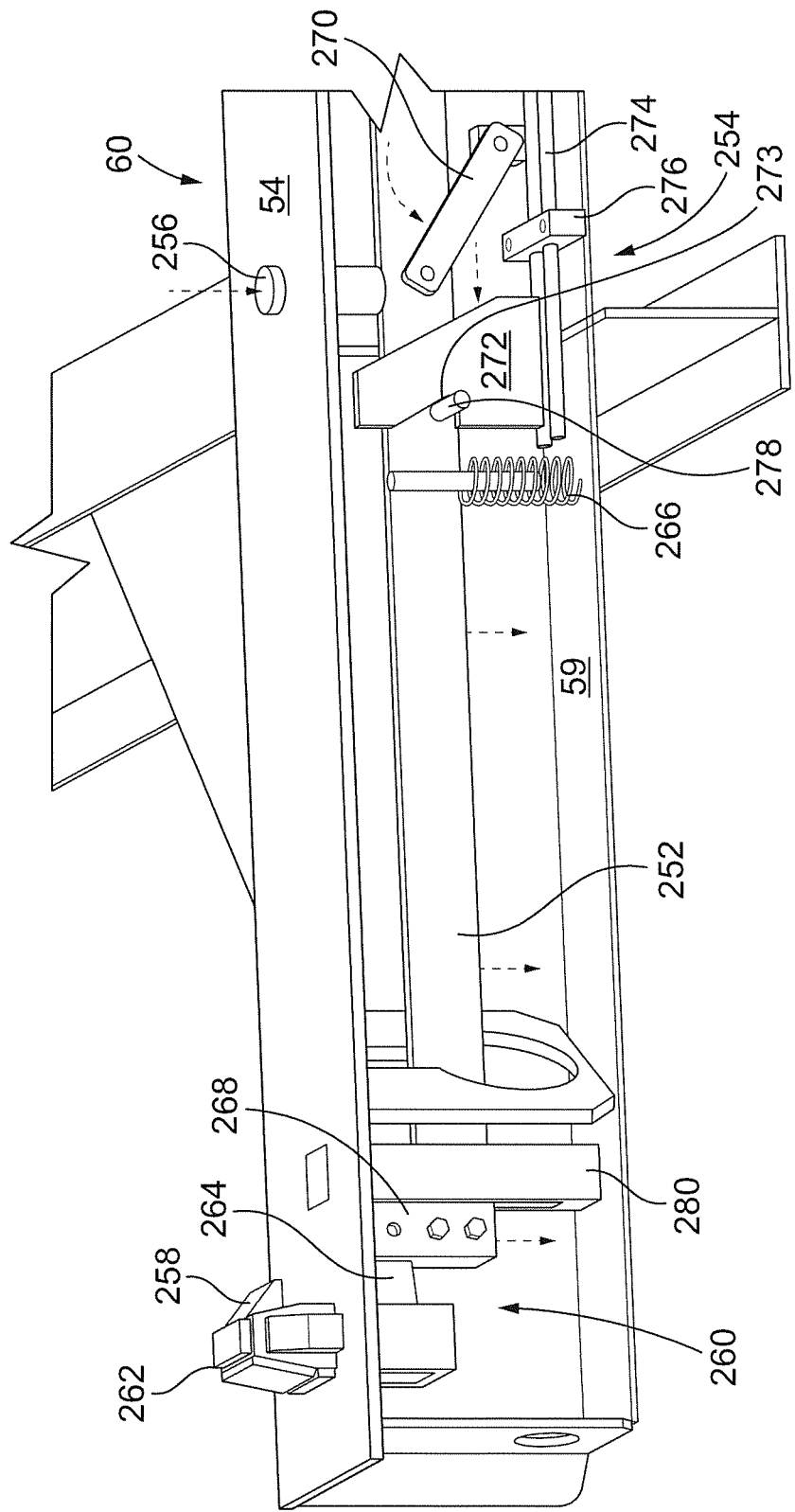
FIG. 19B is a rear isometric view of the second alternative embodiment of latching system in a latched position.
Figure 19C:
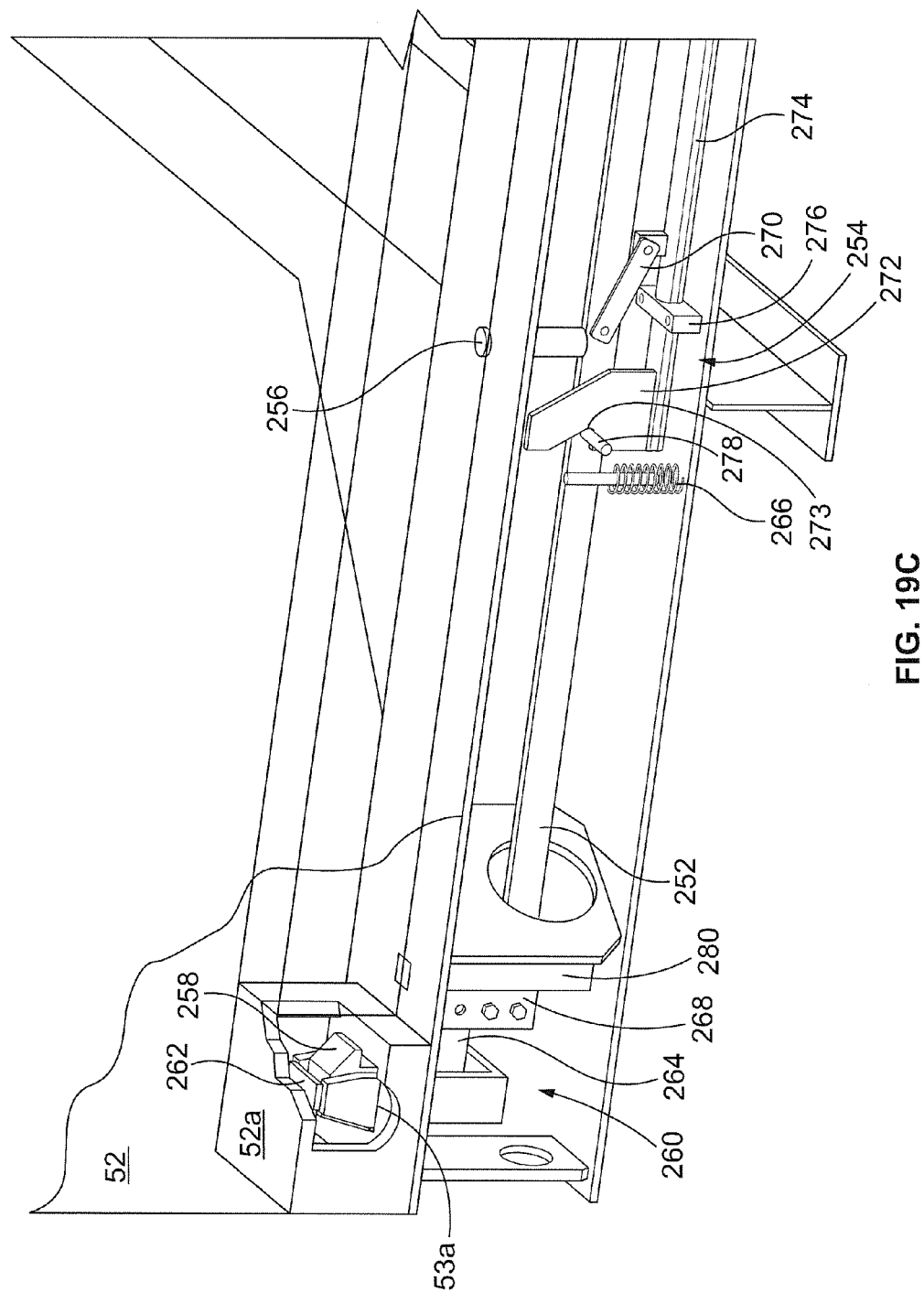
FIG. 19C is a rear isometric view of the second alternative embodiment of latching system of FIG. 19B in a latched position.

Operation of the latch system 251 will now be described. FIGS. 18A and 18B show the latching system 251 in the unlatched position. In this arrangement, the actuation devices 256 extend upward and the latches 258 remain within the latch housing 262. The spring 266 forces the bar 252 upwards. In the latched position of FIG. 19C, the latch housings 262 enter the holes 53a of the corner casting 52a while the bottom surface 56 of the rear portion 52a of the container 52 depresses the actuation devices 252. Depression of the actuation devices 256 causes downward movement of the bar 252, actuating the linkage mechanisms 260 to extend the latches 258 from the latch housings 262. This depression also causes the arm 270 to move downward and force each interlock rod 274 outward toward the latching systems 251. Referring to the latched position shown in FIGS. 19A-C, the latches 258 fully extend from the latch housings 262 and the actuation devices 256 are fully depressed. The engagement of the plates 272 with the protrusions 278 prevent the bar 252 from moving upwards.

Latching Arrangement 300

Figure 20:
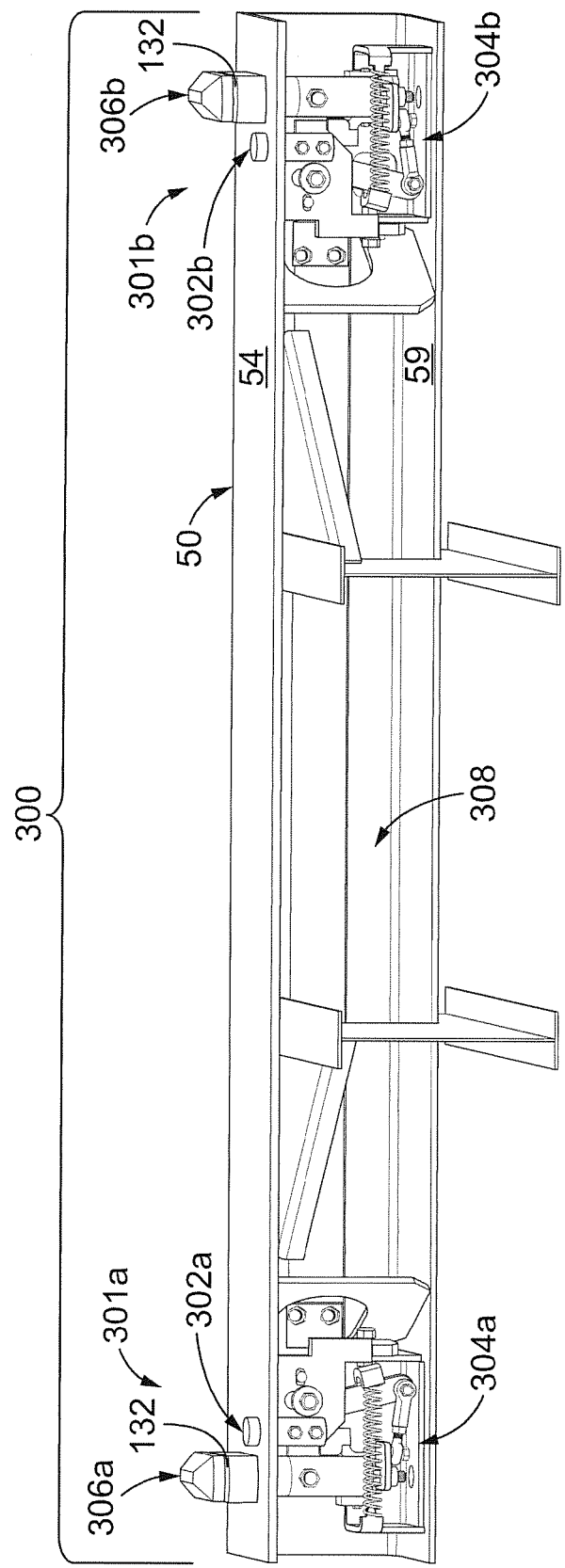
FIG. 20 is a front isometric view of an alternative embodiment of the latching arrangement.
Figure 22:
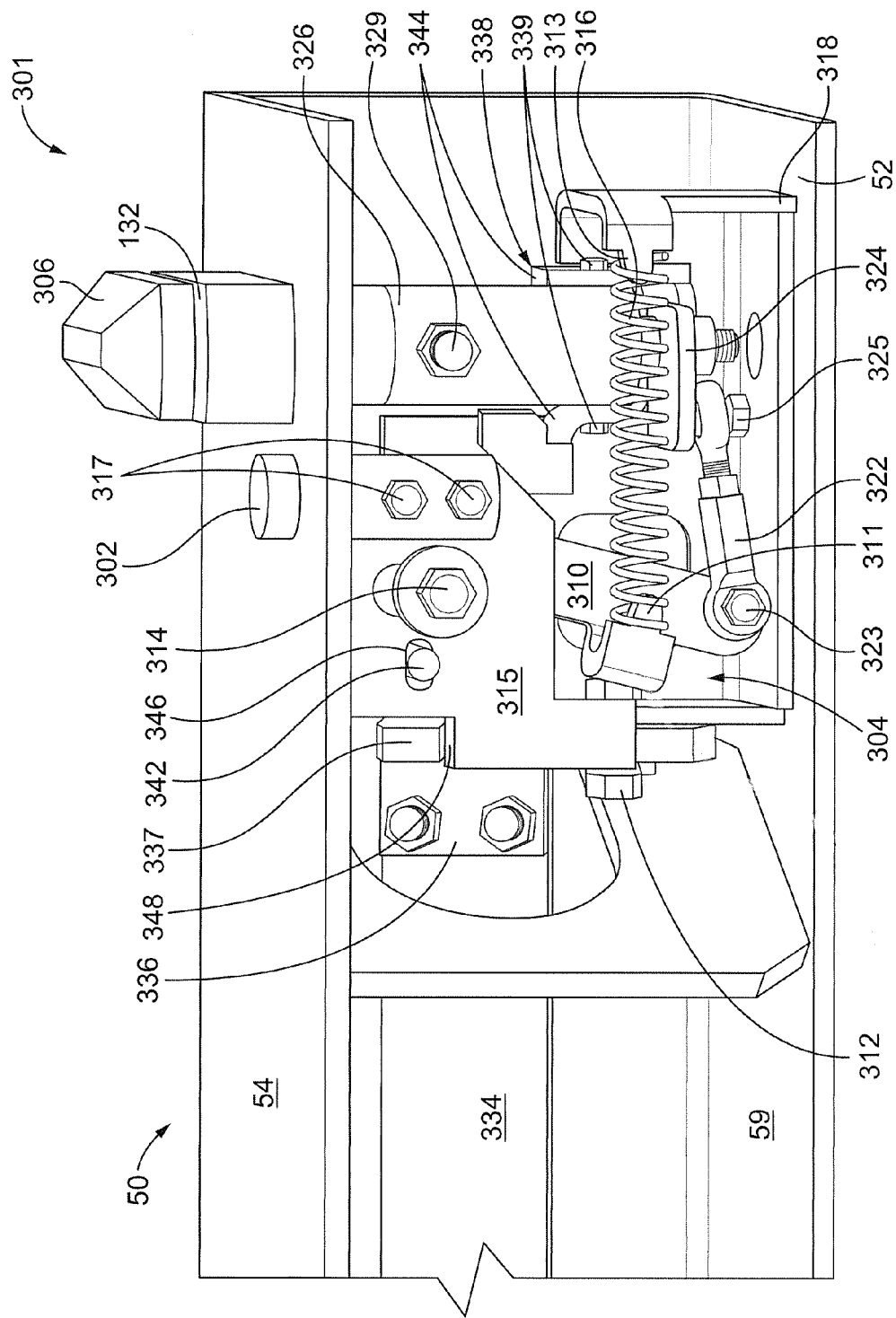
FIG. 22 is a front isometric view of a alternative embodiment of the latching system in an unlatched position.
Figure 24:
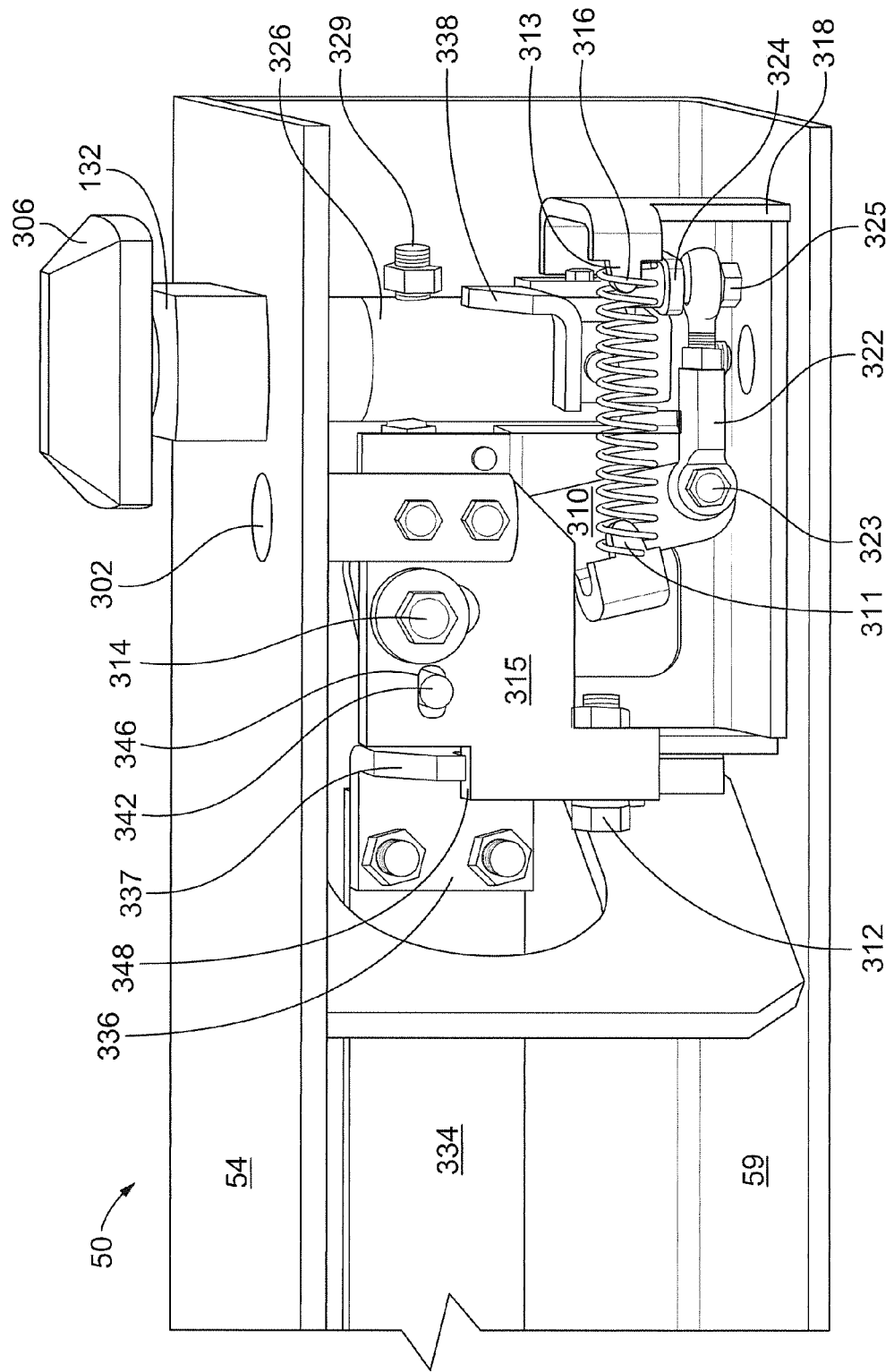
FIGS. 24 and 25 are front isometric views of the alternative embodiment of the latching system in a latched position.

Referring to FIG. 20, an alternative embodiment latching arrangement 300 is provided. Similar to the latching arrangement 100, the latching arrangement 300 includes a first latching system 301a and a second latching system 301b spaced apart at each of the two rear corners of the container chassis 50. An interlock assembly 308 is positioned between the first and second latching systems 301a, 301b. When a container 52 is loaded onto the container chassis 50 (see FIGS. 1 and 17B), each rear corner casting 52a depresses an actuation device 302 of each latching system 301. Depression of the actuation devices 302a, 302b causes respective first and second connectors 306a, 306b to move from an unlatched position as shown in FIG. 22 to a latched position as shown in FIG. 24. Similar to the connector 106 of the latching system 101, the connector 306 of the latching system 301 is disposed atop the further surface 132 above the upper surface 54 of the container chassis 50.

More specifically, placement of the container 52 on the container chassis 50 actuates the actuation devices 302a, 302b of the respective first and second latching systems 301a, 301b, causing respective linkage mechanisms 304a, 304b to move the respective connectors 306a, 306b and automatically secure the container 52 to the container chassis 50. In the latched position, the connectors 306a, 306b prevent movement of the container 52 apart from the container chassis 50.

The interlock assembly 308 is configured to provide a fail-safe operation such that the first and second latching systems 301a, 301b maintain securement of the container 52 to the container chassis 50.

In the example shown in FIG. 20, the connectors 306a, 306b may be twist locks. Other connector means, such as a bolt, a latch, or a pin, may be utilized. Similarly, the actuation devices 302a, 302b in the example embodiment may be plungers, although other actuation means are envisioned. Examples of possible non-powered mechanical means include but not limited to a plunger lever, a switch, a lever arm, a drive bar, and a button. Automatic, powered mechanical means such as an air solenoid, an electric solenoid, a pneumatic cylinder, or a hydraulic cylinder may also be utilized.

Figure 21:
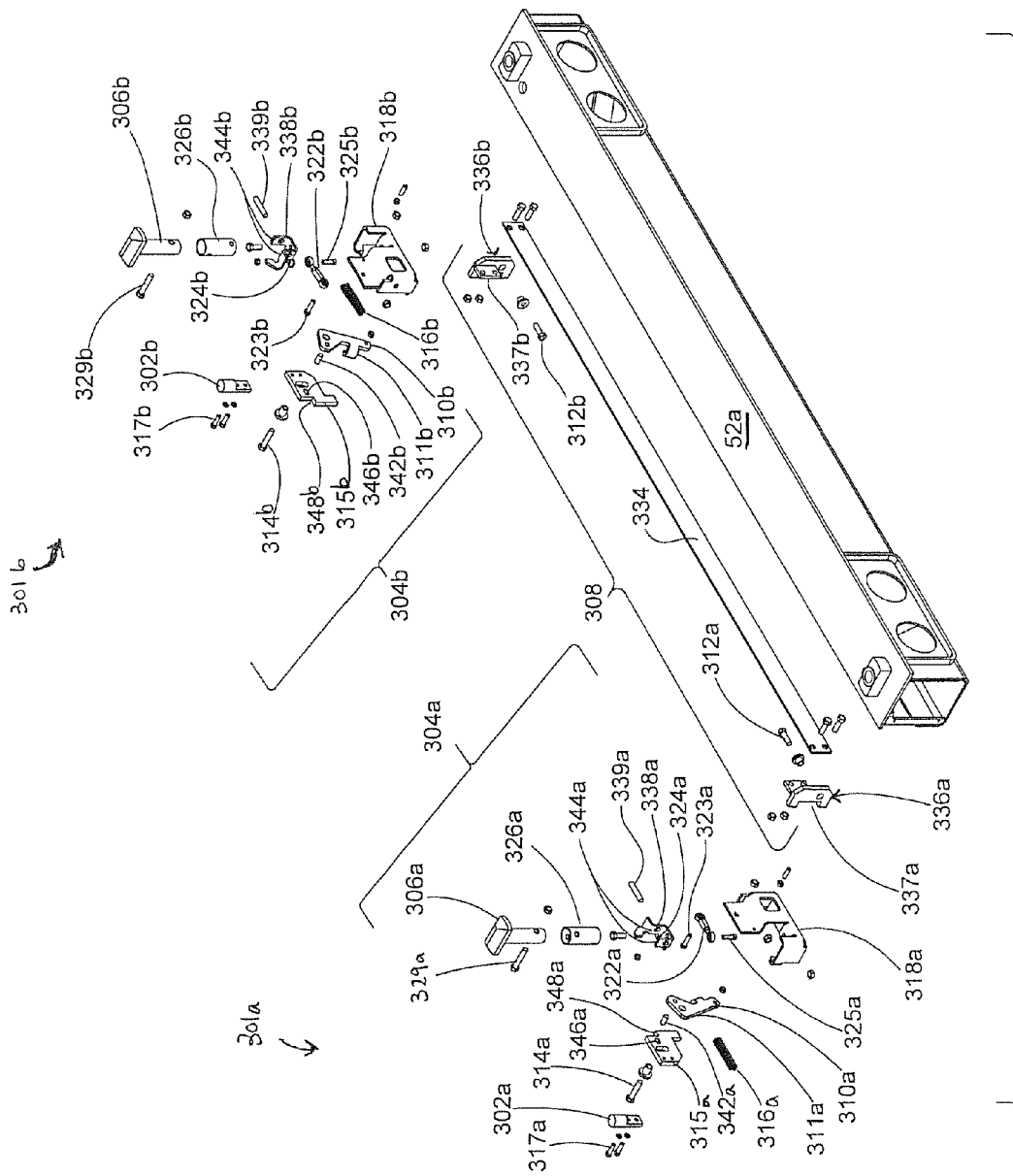
FIG. 21 is an exploded rear isometric view of the alternative embodiment of the latching arrangement of FIG. 20.

Referring now to FIG. 21, the example latching arrangement 300 is shown in an exploded view. Each first and second latching system 301a, 301b of the latching arrangement 300 includes the actuation device 302a, 302b, a linkage mechanism 304a, 304b, and the connector 306a, 306b. Each linkage mechanism 304a, 304b, in this example, includes a lever link 310a, 310b that rotates about a pivot 314a, 314b, a plate 315a, 315b, a spring 316a, 316b, fasteners 317a, 317b, a structure 318a, 318a, a connector link 322a, 322b, a fastener 323a, 323b, an arm 324a, 324b connected to a bracket 338a, 338b, a fastener 325a, 325b, a casing 326a, 326b, a bolt 329a, 329b, and a fastener 339a, 339b. The interlock assembly 308, in this example, includes a bar 334, a bracket 336a, 336b having a C-shaped portion 337a, 337b extending therefrom, and a bolt 312. The plate 315a, 315b includes an upper edge 348a, 348b that engages with the bracket 336a, 336b as described in greater detail below.

The latching device 301 performs the same function as the latching device 101, but includes differently shaped components. Such variation allows for different ways of mounting into the container chassis 50, if desired. In the embodiment shown in FIG. 22, for example, the structure 318 which provides the pivot 314 is mounted onto the bottom surface 59 of the container chassis 50 by bolts, fasteners, or other suitable means. In contrast, as shown in FIG. 4, the pivot 114 about which the lever link 110 of the latching system 101 rotates is provided by the structure 115 that is welded or otherwise secured to the underside of the upper surface 54 of the container chassis 50.

The components of the latching device 301 also allow for different manufacturing methods specific to each component. For example, the bracket 338 includes two opposing side portions 344 having aligned through-holes that receive the casing 326. Fasteners 339 extend through the through-holes to securely fasten the bracket 338 to the casing 326. Further, the arm 324 extends horizontally from the bottom of the bracket 338 such that rotation of the arm 324 translates to rotation of the connector 306.

Referring to FIG. 22, movement of the actuation device 302 causes the lever link 310 to rotate about the pivot 314 mounted on the structure 318. Specifically, the lever link 310 includes a pin 342 that extends horizontally therefrom and through an opening 346 on the plate 315, which is secured to the actuation device 302. The rotational movement of the lever link 310 causes horizontal movement of the connector link 322 which causes rotational movement of the arm 324 and the bracket 338, and the casing 326 and the connector 306 secured thereto, about a central axis thereof.

Figure 23:
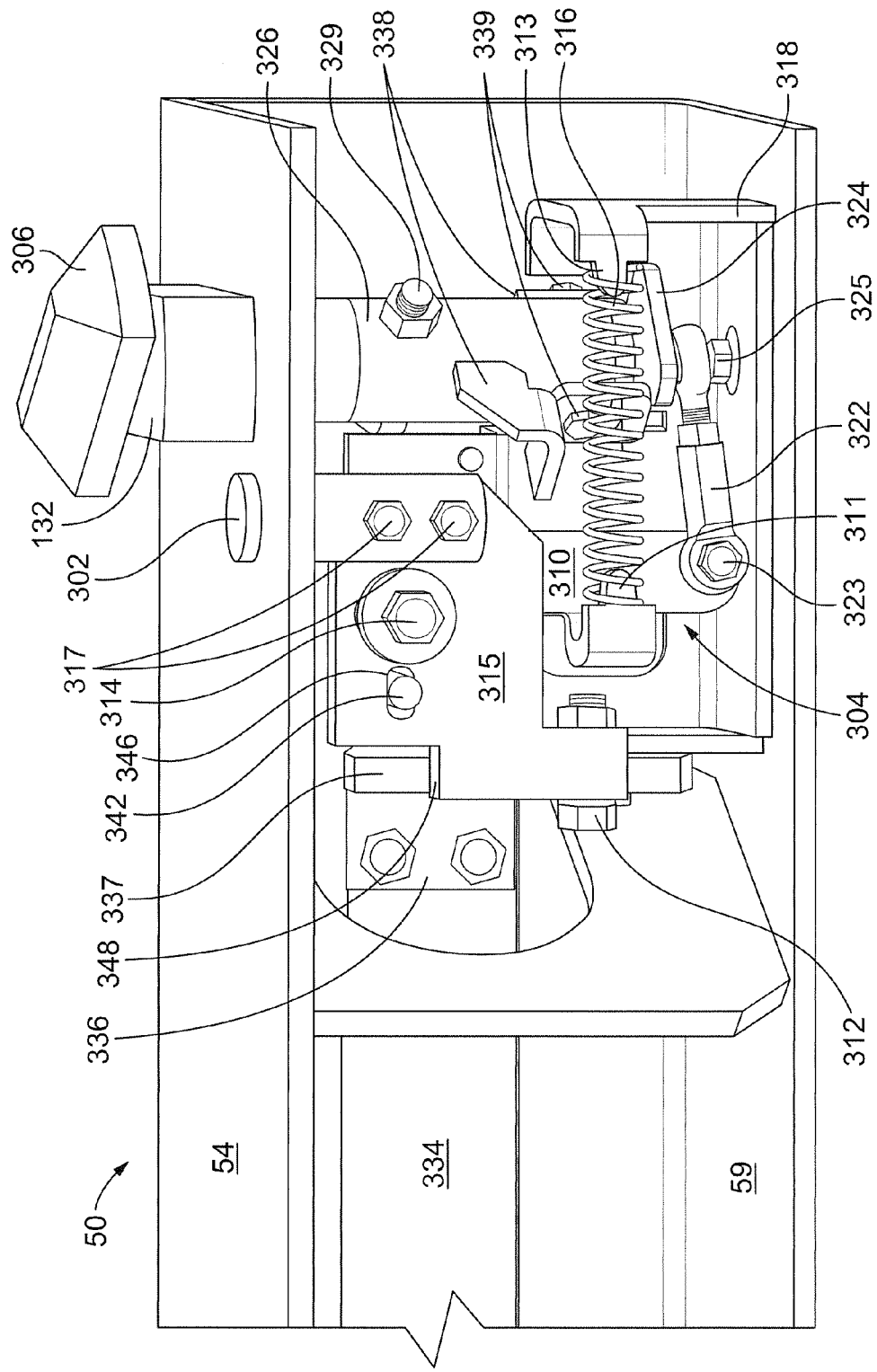
FIG. 23 is a front isometric view of the alternative embodiment of the latching system in partially unlatched positions.

FIG. 23 shows movement of the actuation device 302, the linkage mechanism 304, and the connector 306 as the actuation device 302 is moved partially downward. Downward movement of the actuation device 302 causes downward movement of the structure 315 and rotational movement of level link 310 about the pivot 314. The spring 316 is disposed between an extension 313 in the structure 318 and an extension 311 of the lever link 310 such that the spring 316 is biased against movement of the lever link 310. FIG. 24 shows the latching device 301 in the latched position.

Figure 25:
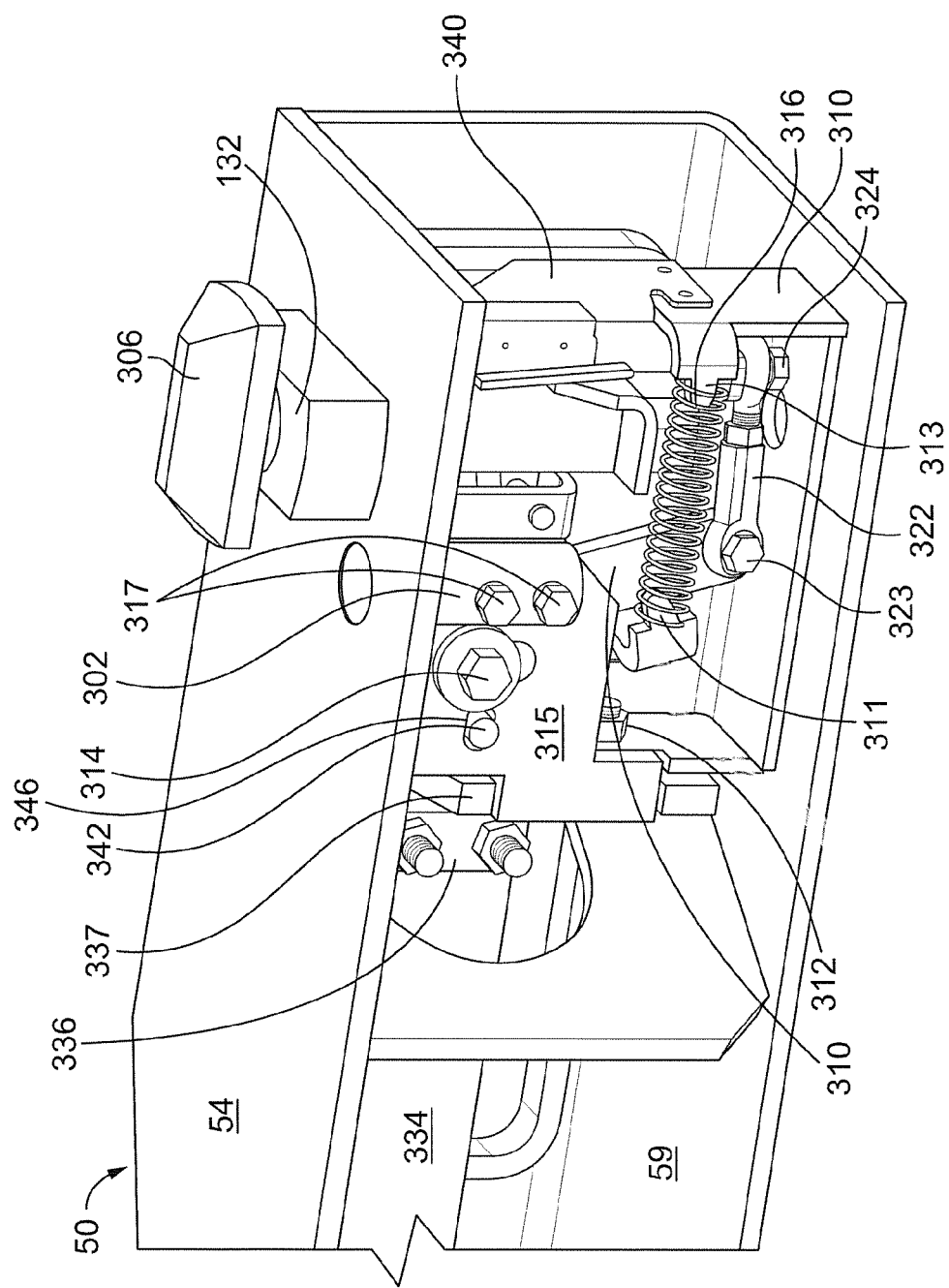

As shown in FIG. 25, the latching device 300 may include a limit switch 340 that detects whether the latching system 301 is latched or unlatched, and communicates such status to the driver through an indicator light (not shown). During operation, the limit switch 340 may monitor movement of the actuation device 302, the linkage mechanism 304, or the connector 306.

Referring again to FIGS. 21-24, the interlock assembly 308 of the latching arrangement 300 operates similarly to the interlock assembly 152 of the front pin latching arrangement 150. The bolt 312 extending through the structure 318 provides a pivot about which the bracket 336 rotates. The movement of the C-shaped portion 337 is coordinated with the movement of plate 315 as the actuation device 302 moves downward. Specifically, rotation of the bar 334 about the bolt 312 causes the C-shaped portion 337 to hook the upper edge 348 of the plate 315 as the plate 315 moves downward. Further, in this embodiment, the bar 334 comprises a flat bar or plate, although other embodiments may utilize a rod having a curved, square, or any geometrical cross section. The cross-sectional size and dimension of the bar may be adjusted based on the load requirements. For example, a larger cross-sectional area provides greater support.

Operation of the latching arrangement 300 will now be described. FIG. 22 shows the latching system 301 in the unlatched position. The actuation device 302, in this example, extends upwards from the surface 54 of the container chassis 50. The C-shaped portion of the bracket 336 rests against the plate 315. In FIG. 24, the latching system 301 is shown in a partial latched position. The connector 306 enters the hole 53a (see FIG. 17B) of the corner casting 52a while a bottom surface 56 of the corner casting 52a depresses the actuation device 302. This depression rotates the lever link 310 of the linkage mechanism 304 about the pivot 314, which causes the connector 306 to rotate. Referring to the latched position shown in FIG. 25, the connector 306 is fully rotated within the corner casting 52a and the actuation device 302 is fully depressed. The bracket 336 of the interlock assembly 308 captures the edge 348 of the plate 315 of the linkage mechanism 304 to prevent the plate 315 from upward movement.

Front Pin Latching Arrangement 350

Figure 26:
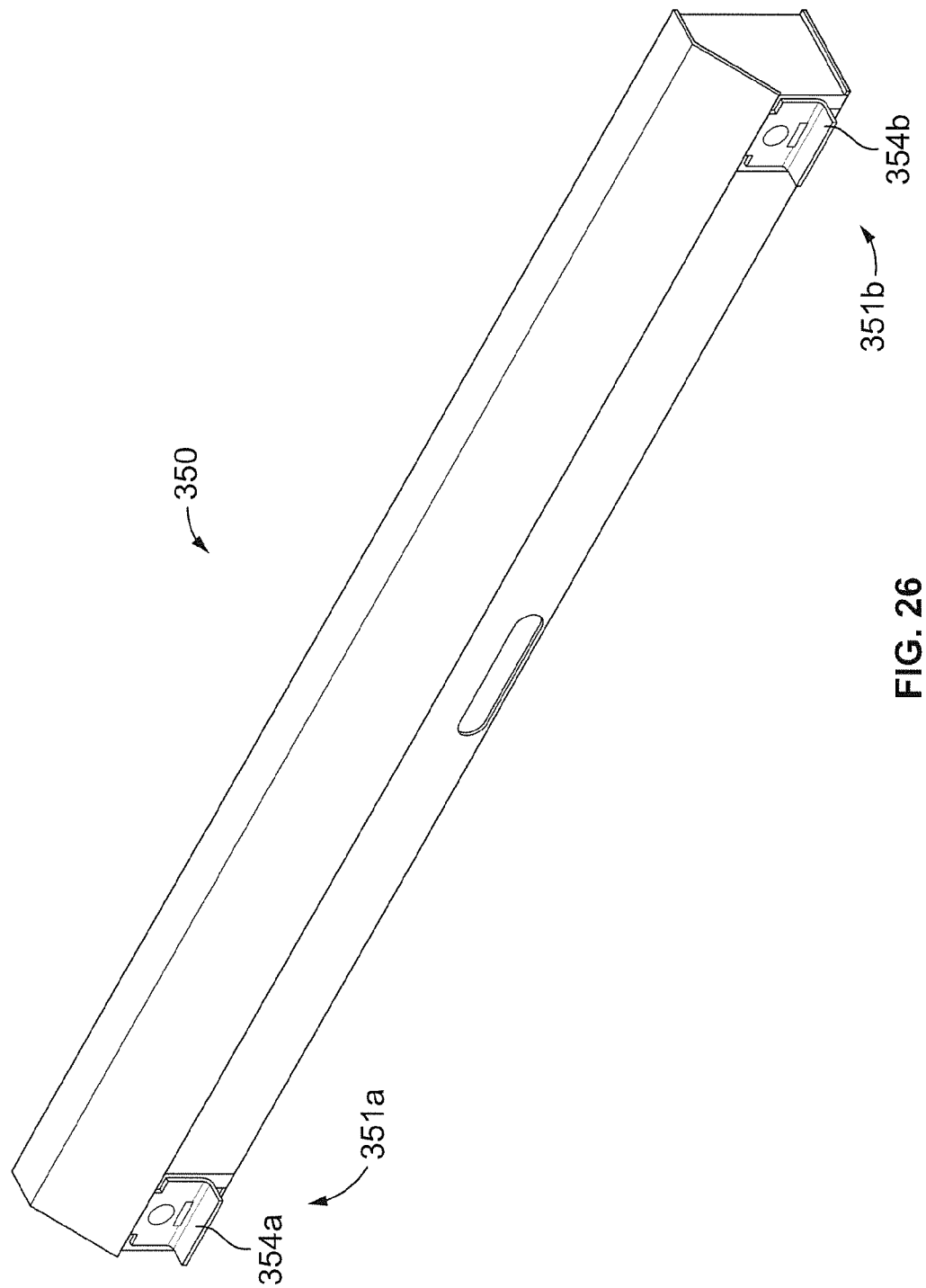
FIG. 26 is a rear isometric view of an alternative embodiment of the front pin latching arrangement.
Figure 27:
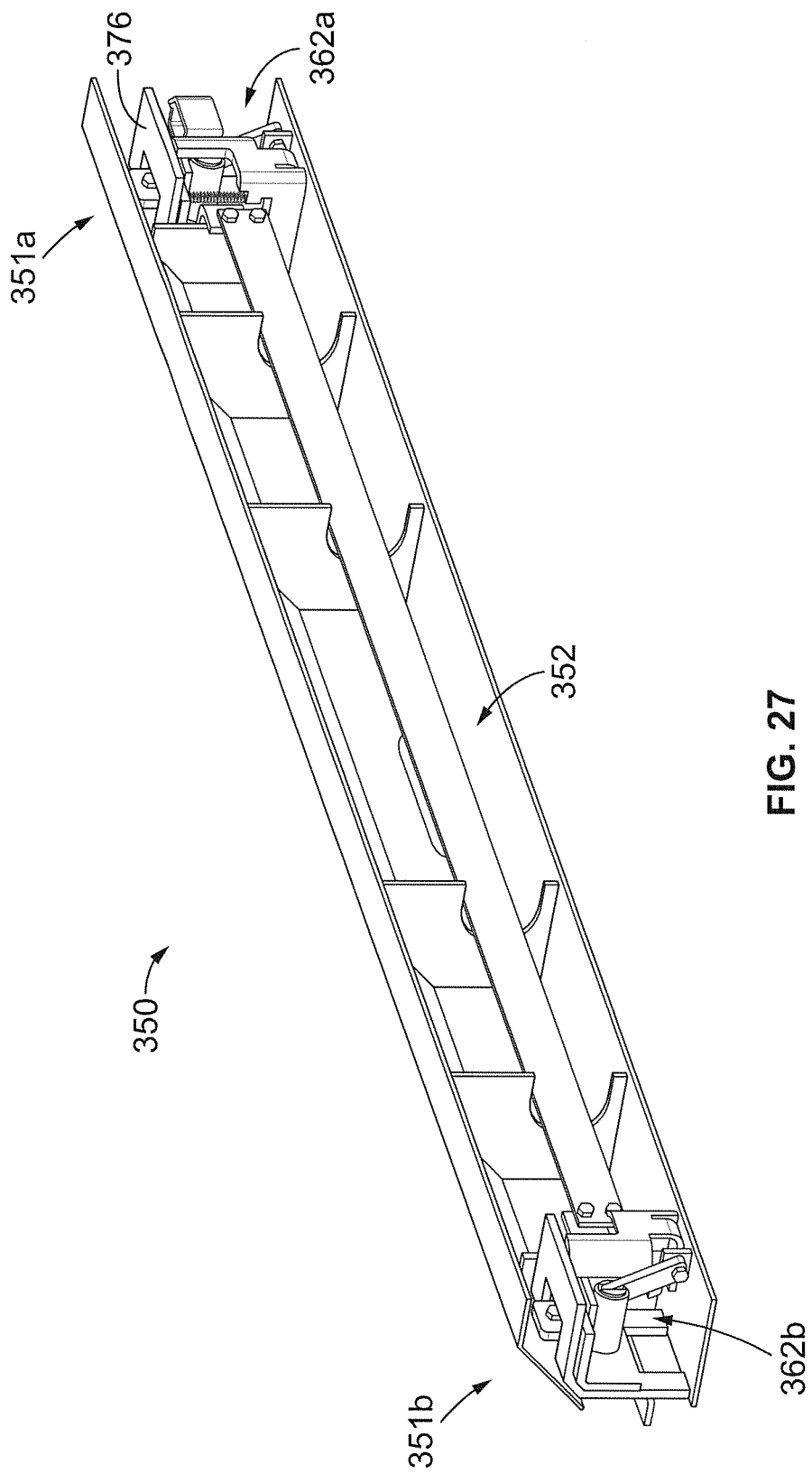
FIG. 27 is a front isometric view of the alternative embodiment of the front pin latching arrangement of FIG. 26.

Referring to FIG. 26, an alternative embodiment of the front pin latching arrangement 350 for automatic securement of a container 52 to a container chassis 50 is shown. Similar to the previously described embodiment 150, the front pin latching arrangement 350 includes a first front pin latching system 351a and a second front pin latching system 351b disposed proximate to two front corners of a container chassis 50. Each front pin latching system 351a, 351b, in this example, includes a shelf 354a, 354b and a pin 360 (shown in FIG. 32) that move between first, unlatched positions (shown in FIG. 29) and second, latched positions (shown in FIG. 32). When a container 52 is loaded onto the container chassis 50 as shown in FIG. 1, the shelf 354 receives a corner casting 52b of the container 52 and moves downwardly such that the pin 360 extends outwardly into a corner casting opening 53b (see FIG. 8) of the corner casting 52b to secure the container 52 to the container chassis 50.

Placement of the container 52 on the container chassis 50 moves the shelf 354, causing the linkage mechanism 362 to move the pin 360 such that the pin 360 automatically secures the container 52 to the container chassis 50. The pin 360 restricts movement between the corner casting 52b of the container 52 and the container chassis 50 such that each front pin latching system 351 automatically secures the container 52 to the container chassis 50. In this example, the front pin latching arrangement 350 also includes an interlock assembly 352 operably coupled to the first and second front pin latching systems 351a, 351b. The interlock assembly 352 is configured to provide a fail-safe operation to such that the first and second front pin latching systems 351a, 351b maintain securement of the container 52 to the container chassis 50.

The front pin latching arrangement 350 operates similarly to the front pin latching arrangement 150 described above and utilizes alternative parts to accomplish the goals noted above. Such variation allows for different ways of mounting into the container chassis 50, if desired.

Figure 28:
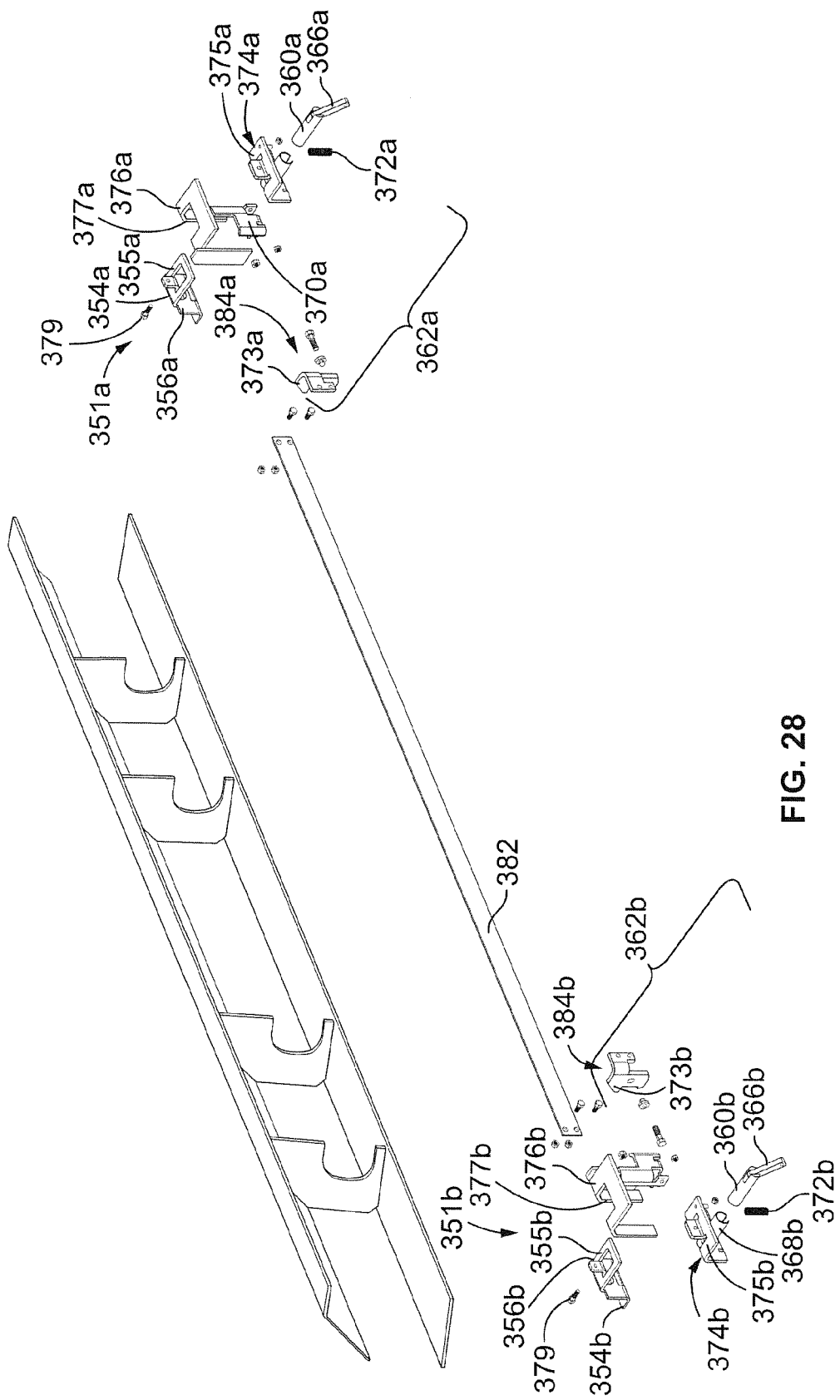
FIG. 28 is an exploded front isometric view of the alternative embodiment of the front pin latching arrangement of FIG. 26.
Figure 30:
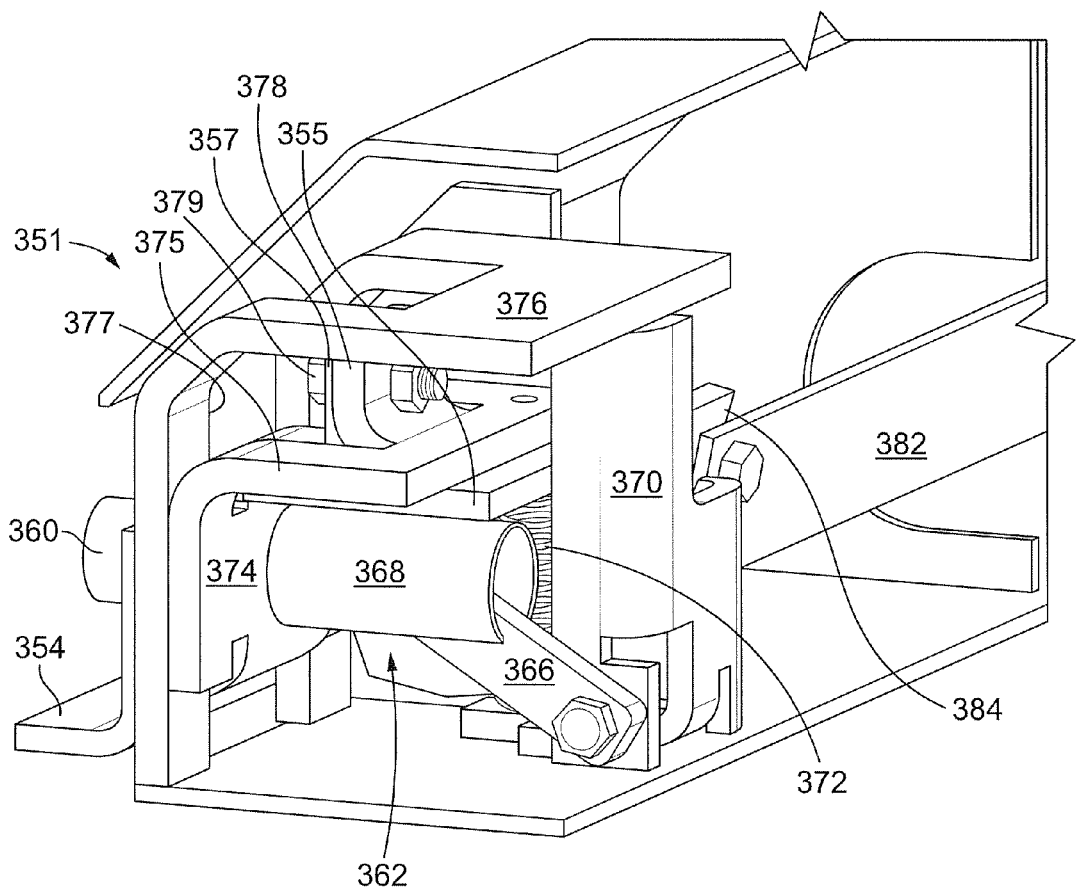
FIGS. 30 and 31 are front isometric views of the alternative embodiment of the front pin latching system in partially unlatched positions.

Referring to FIG. 28, the front pin latching arrangement 350 is shown in an exploded view. Each of the first and second front pin latching systems 351a, 351b includes the shelf 354a, 354b, the pin 360a, 360b, and the linkage mechanism 362a, 362b. As shown in the example of FIG. 30, the linkage mechanism 362a, 362b includes a link 366a, 366b, a pin housing 368a, 368b, a structure 370a, 370b, a spring 372a, 372b, an interior frame 374a, 374b, and an exterior frame 376a, 376b. The interlock assembly 352, in this example embodiment, includes a bar 382, brackets 384a, 384b having a C-shaped portion 373a, 373b extending therefrom, and a bolt 386a, 386b. The shelf 354a, 354b includes an upper edge 356a, 356b that engages with the bracket 384a, 384b as described in greater detail below.

Figure 29:
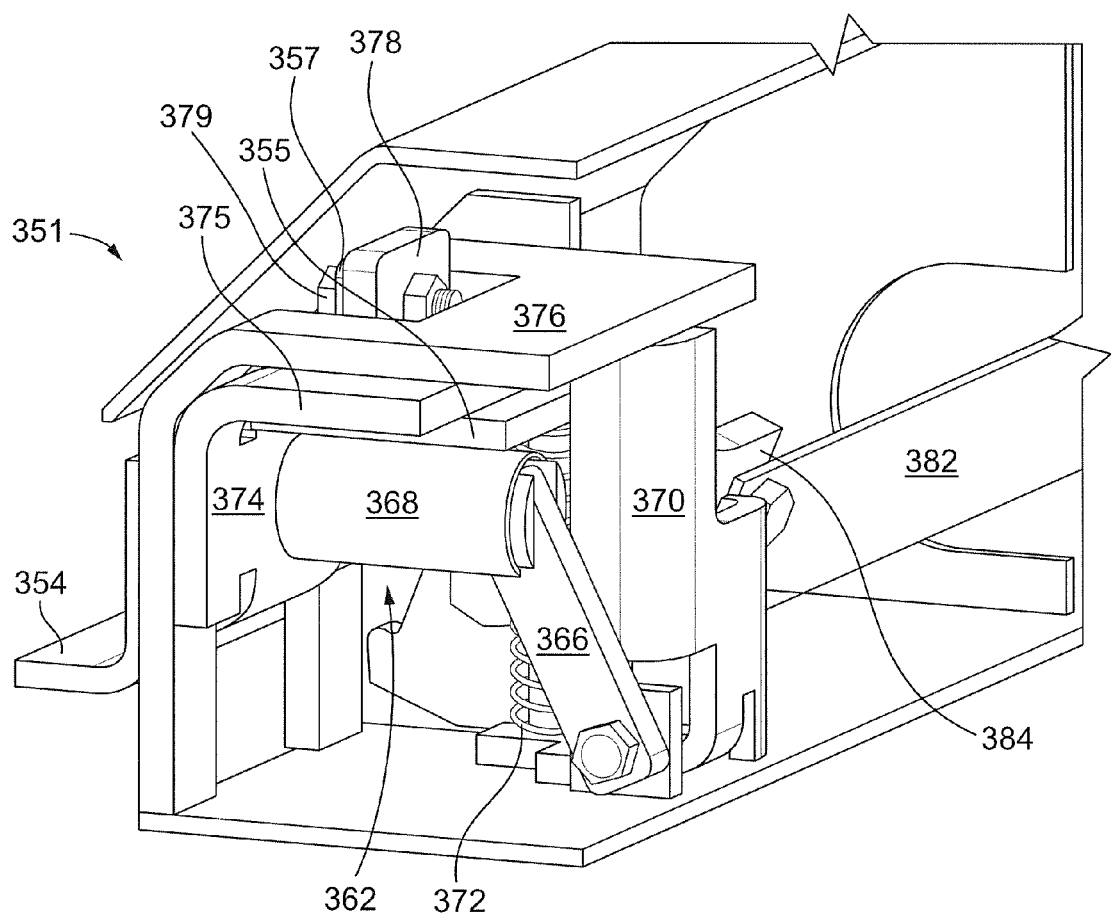
FIG. 29 is a front isometric view of an alternative embodiment of the front pin latching system in an unlatched position.

As seen in FIG. 29, the shelf 354, the interior frame 374, and the exterior frame 376 allow for a secure interfitting of the components and may be installed directly onto a container chassis without the need for an insert, if desired. More specifically, the shelf 354 includes a planar portion 355 that extends through an opening 377 of the exterior frame 376. The interior frame 374 includes a planar portion 375 that is disposed atop the planar portion 355 of the shelf 354. Each of the planar portions 375, 355 include respective tabs 378, 357 extending perpendicular therefrom. A bolt 379 or other fastener extends through the tabs 378, 357 to secure the frames 374, 376 together.

Figure 31:
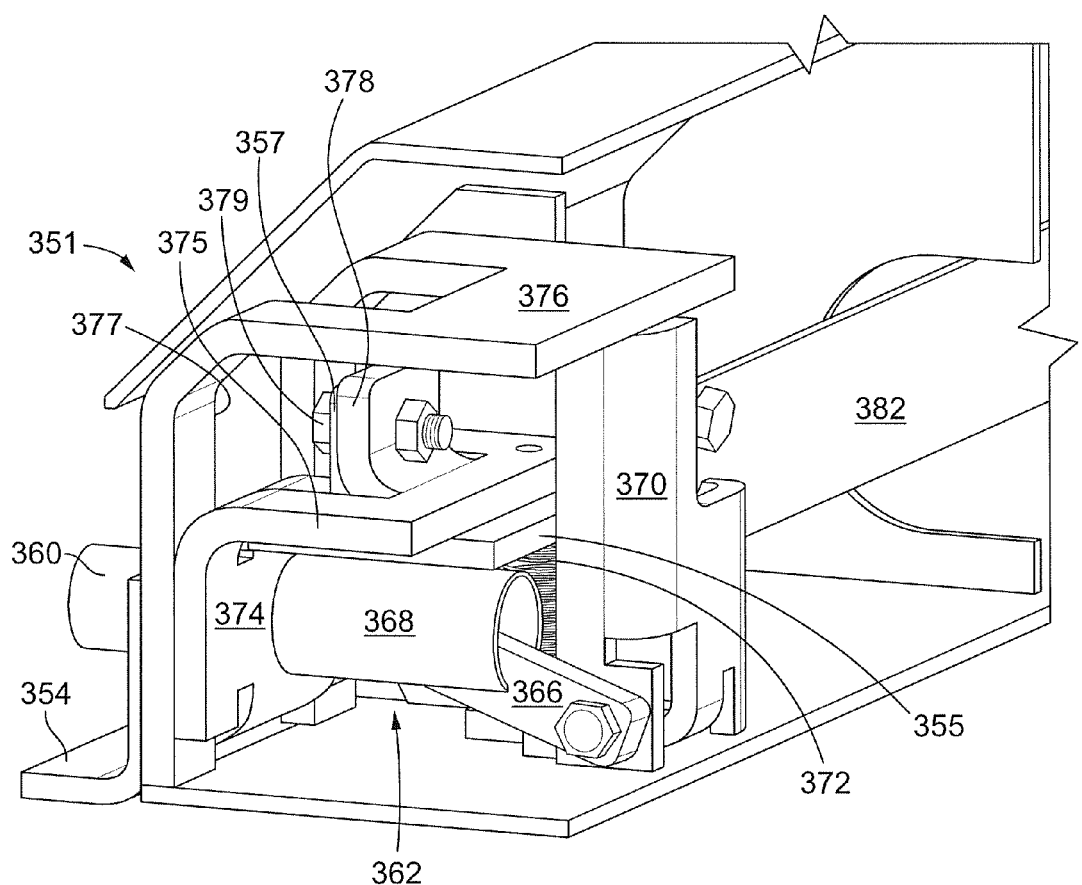
Figure 32:
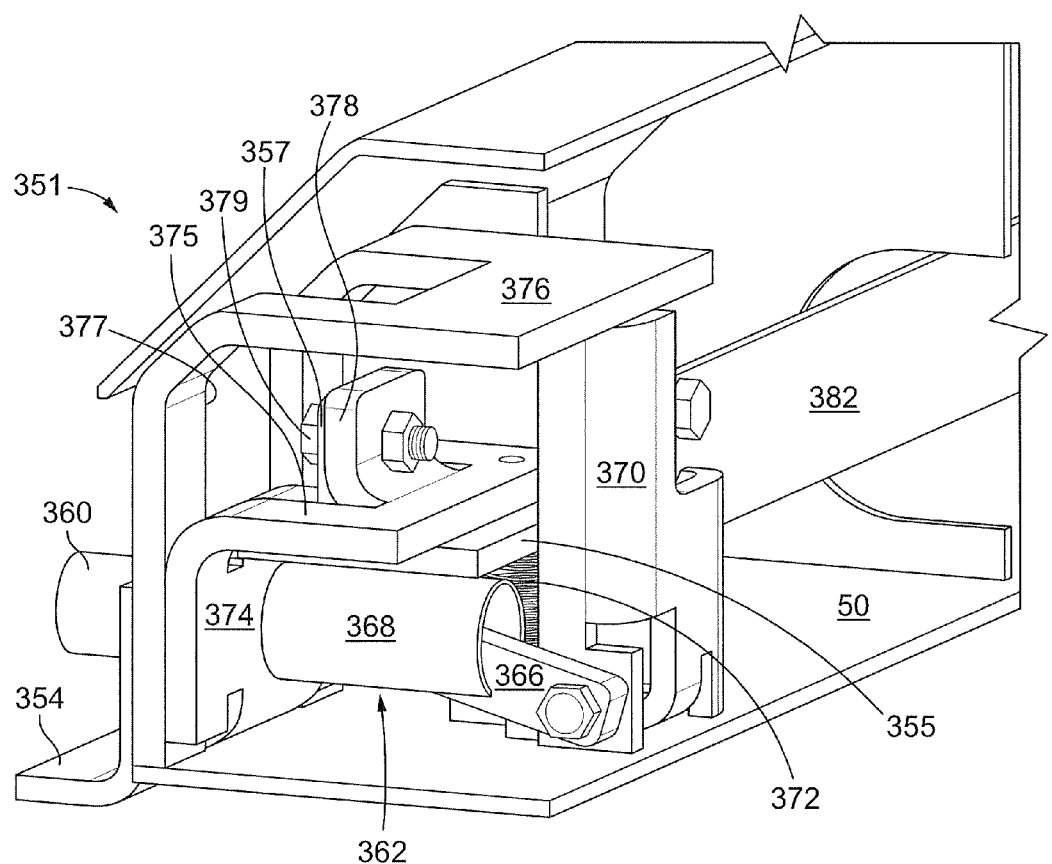
FIG. 32 is a front isometric view of the alternative embodiment of the front pin latching system in a latched position.

Referring to FIG. 30, downward movement of the shelf 354 causes downward movement of the interior frame 374, which causes the pin 360 to move horizontally through the pin housing 368. The shelf 354 moves downward along the exterior frame 376. The spring 372 biases the planar portion 375 of the interior frame 374, and the planar portion 355 of the shelf 354 connected thereto, against downward movement. FIG. 31 illustrates the shelf 354 in a further partial latched position, and FIG. 32 shows the shelf 354 in the lowermost, latched position.

Figure 33:
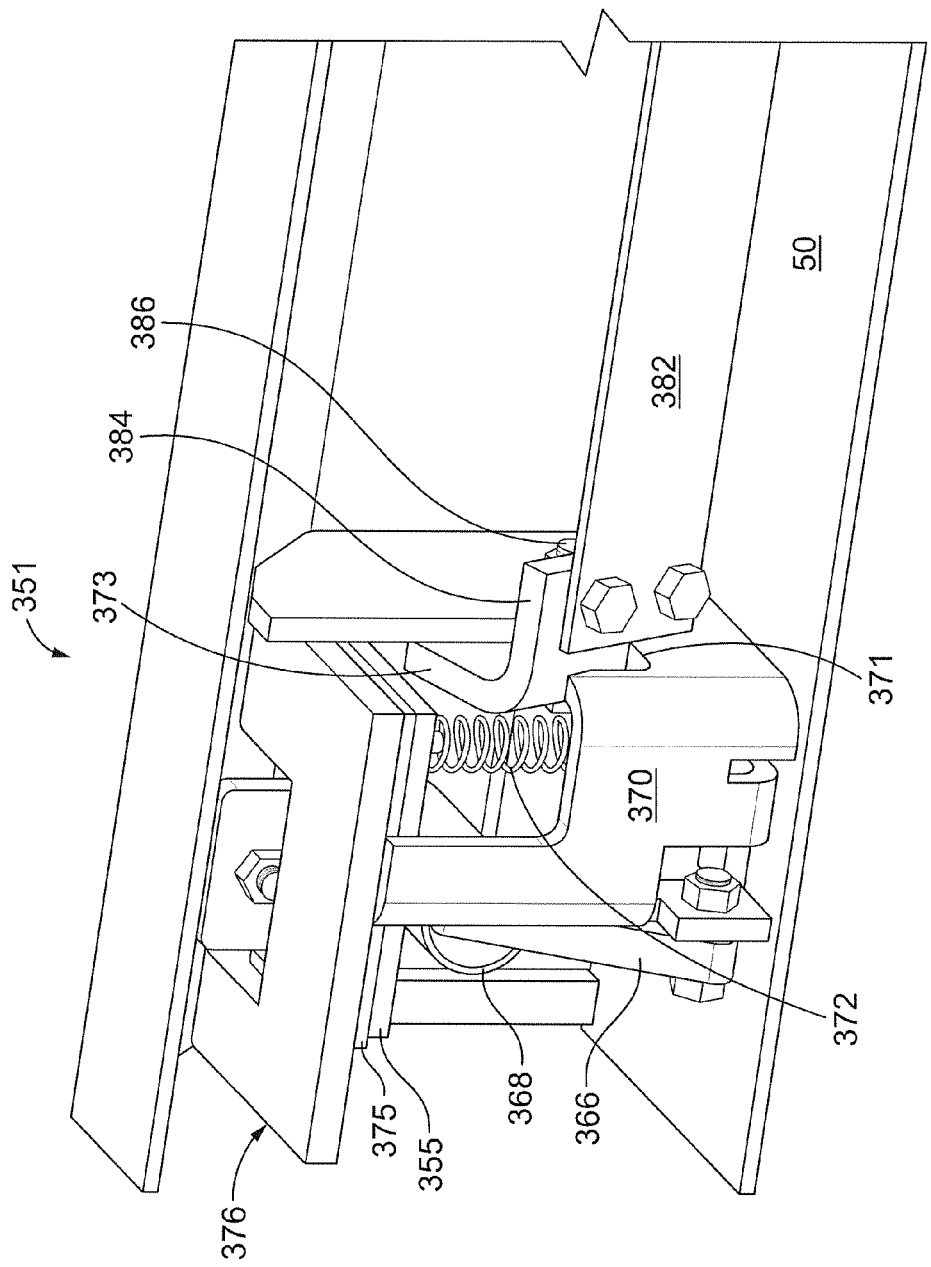
FIG. 33 is a front isometric view of an alternative embodiment of the interlock assembly of the alternative embodiment of the front pin latching arrangement.

As shown in FIG. 33, the structure 370 includes a notch 371 through which the bracket 384 of the interlock assembly 352 extends. The bolt 386 extending through the structure 370 provides a pivot about which the bracket 384 rotates. As the shelf 354 moves downward, the bracket 384, and the bar 382 attached thereto, rotates such that the C-shaped portion 373 hooks the upper edge 356 of the shelf 354. In the example embodiment, the bar 382 is a planar bar having a rectangular cross section. The cross-sectional size and dimension of the bar may be adjusted based on the load requirements. For example, a larger cross-sectional area provides greater support.

Operation of the front pin arrangement 350 will now be described. In reference to FIG. 29, the shelf 354 of each front pin latching system 351 rests in the unlatched position prior to placement of a container 52 on the container chassis 50. The pin 360 remains disposed within the pin housing 368. As the corner casting 52b of the container 52 is placed on the shelf 154, the shelf 354 moves downwardly into the latched position. Such movement causes the link 366 to force the pin 360 outwardly from the shelf 354, as seen in FIGS. 30 and 31. Once the shelf 354 reaches the lowermost position shown in FIG. 32, the pin 360 fully extends from the shelf 354 into the opening 53b of the corner casting 52b.

Downward movement of the shelves 354a, 354b of the respective front pin latching systems 351a, 351b also causes the interlock assembly 352 to move between the first and second positions. As the shelves 354a, 354b of the front pin latching systems 351a, 351b move downwardly upon placement of the container 52 on the container chassis 50, the respective brackets 384a, 384b rotate about the respective bolts 386a, 386b. The C-shaped portions 372a, 372b of the respective brackets 384a, 384b receive the respective upper edges 356a, 356b of the respective shelves 354a, 354b as such shelves 354a, 354b move downward such that the shelves 354a, 354b are prevented from moving upwards.

When the container 52 is removed from the container chassis 50, the springs 372a, 372b of the respective front pin latching systems 351a, 351b bias the respective shelves 354a, 354b upwards, which causes the respective link 366a, 366b to move the respective pin 360a, 360b to horizontally into the respective pin housing 368a, 368b. Upward movement of the respective shelves 354a, 354b also causes the respective brackets 384a, 384b to rotate about the respective bolts 386a, 386b such that the respective C-shaped portions 372a, 372b of the respective brackets 384a, 384b release the respective upper edges 356a, 356b of the respective shelves 354a, 354b, thereby enabling the respective spring 372a, 372b to bias the respective upper edge 356a, 356b of the respective shelves 354a, 354b upwards.

INDUSTRIAL APPLICABILITY

The disclosure has been presented in an illustrative manner in order to enable a person of ordinary skill in the art to make and use the disclosure, and the terminology used is intended to be in the nature of description rather than of limitation. It is understood that the disclosure may be practiced in ways other than as specifically disclosed, and that all modifications, equivalents, and variations of the present disclosure, which are possible in light of the above teachings and ascertainable to a person of ordinary skill in the art, are specifically included within the scope of the impending claims. All patents, patent publications, and other references cited herein are incorporated herein by reference.

We claim:

1. A front pin latching system for automatic securement of a container to a container chassis comprising:
    a shelf configured to move vertically on an outer surface of the container chassis, wherein the shelf and the container chassis have adjacent openings;
    a pin configured to move horizontally through the adjacent openings; and
    a linkage mechanism disposed on an inner surface of the container chassis, wherein the linkage mechanism is operably coupled to the shelf and the pin;
    wherein placement of the container on the container chassis moves the shelf causing the linkage mechanism to move the pin horizontally through the adjacent openings and vertically with the shelf such that the pin automatically secures the container to the container chassis.

2. The front pin latching system of claim 1, wherein the container chassis comprises an insert to which the latching system is mounted.

3. The front pin latching system of claim 1, wherein the shelf receives a corner casting of the container chassis, and wherein the corner casting has a corner casting opening such that the pin enters the corner casting opening as the shelf moves downward.

4. The front pin latching system of claim 3, wherein the pin restricts movement between the corner casting of the container and the container chassis.

5. The front pin latching system of claim 1, wherein the linkage mechanism translates the vertical movement of the shelf to horizontal movement of the pin during placement of the container on the container chassis.

6. The front pin latching system of claim 5, wherein the shelf rests in a first position when the container chassis is not loaded with the container, and the shelf rests in a second position when the container chassis is loaded with the container.

7. The front pin latching system of claim 6, wherein movement of the shelf from the first position to the second position causes the pin to extend outwardly from the container chassis.

8. The front pin latching system of claim 1, wherein the linkage mechanism comprises a plate having a bore disposed on the inner surface of the container chassis, wherein the placement of the container on the container chassis causes the plate to move vertically with the shelf, and causes the pin to move horizontally through the bore.

9. The front pin latching system of claim 8, wherein the linkage mechanism further comprises:
a pivot mounted on the container chassis; and
a link having a first end coupled to the pin and a second end coupled to the pivot;
wherein movement of the shelf causes rotation of the link about the pivot, thereby causing movement of the pin.

10. The front pin latching system of claim 6, wherein the linkage mechanism comprises a spring biased in an upwardly direction against movement of the shelf.

11. The front pin latching system of claim 10, wherein the spring biases the shelf into the first position.

12. The front pin latching system of claim 11, wherein the linkage mechanism further comprises a spring housing attached to the shelf, and wherein the spring is disposed between a cover on the spring housing and a bottom surface of the container chassis.

13. The front pin latching system of claim 6, wherein the linkage mechanism further comprises interfitting interior and exterior frames, and wherein the interior frame moves relative to the exterior frame during operation.

14. The front pin latching system of claim 8, wherein the bore maintains the vertical position of the pin as the pin moves vertically.

* * * * *